(12) United States Patent
Chen et al.

(10) Patent No.: US 7,706,466 B2
(45) Date of Patent: Apr. 27, 2010

(54) LOWER COMPLEXITY LAYERED MODULATION SIGNAL PROCESSOR

(75) Inventors: Ernest C. Chen, San Pedro, CA (US); Weizheng W. Wang, Rancho Palos Verdes, CA (US); Guangcai Zhou, Reseda, CA (US); Tung-Sheng Lin, Alhambra, CA (US); Joseph Santoru, Agoura Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/329,456

(22) Filed: Dec. 5, 2008

(65) Prior Publication Data

US 2009/0097589 A1    Apr. 16, 2009

Related U.S. Application Data

(63) Continuation of application No. 10/532,632, filed as application No. PCT/US03/32264 on Oct. 10, 2003, now Pat. No. 7,512,189, which is a continuation-in-part of application No. 09/844,401, filed on Apr. 27, 2001, now Pat. No. 7,209,524.

(60) Provisional application No. 60/421,331, filed on Oct. 25, 2002.

(51) Int. Cl.
*H04L 27/00* (2006.01)
(52) U.S. Cl. .................................... 375/295; 375/299
(58) Field of Classification Search ................ 375/265, 375/267, 295, 299, 349, 347
See application file for complete search history.

(56) References Cited

U.S. PATENT DOCUMENTS

| 3,076,180 A | 1/1963 | Havens et al. |
| 3,383,598 A | 5/1968 | Sanders |
| 3,878,468 A | 4/1975 | Falconer et al. |

(Continued)

FOREIGN PATENT DOCUMENTS

CA    2442400    11/2002

(Continued)

OTHER PUBLICATIONS

Notice of Allowance dated Oct. 23, 2008 in U.S. Appl. No. 10/962,346, filed Oct. 8, 2004 by Ernest C. Chen.

(Continued)

*Primary Examiner*—Emmanuel Bayard

(57) ABSTRACT

A method and apparatus for transmitting and receiving a coded signal having an upper layer signal and a lower layer signal is disclosed. The method comprises the steps of combining the upper layer signal and the lower layer signal, encoding the combined upper layer signal and lower layer signal, delaying the upper layer signal, modulating the delayed upper layer signal, modulating the lower layer signal, transmitting the delayed upper layer signal and transmitting the lower layer signal. The apparatus comprises an encoder, for encoding a combined upper layer signal and lower layer signal, a delay, communicatively coupled to the encoder, for delaying the upper layer signal, a first modulator, for modulating the delayed upper layer signal, a second modulator, for modulating the lower layer signal, a transmitter, communicatively coupled to the first modulator, for transmitting the delayed upper layer signal, and a second transmitter, communicatively coupled to the second modulator.

10 Claims, 23 Drawing Sheets

U.S. PATENT DOCUMENTS

| | | |
|---|---|---|
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |
| 4,416,015 A | 11/1983 | Gitlin |
| 4,422,175 A | 12/1983 | Bingham et al. |
| 4,484,337 A | 11/1984 | Leclert et al. |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |
| 4,637,017 A | 1/1987 | Assal et al. |
| 4,647,873 A | 3/1987 | Beckner et al. |
| 4,654,863 A | 3/1987 | Belfield et al. |
| 4,670,789 A | 6/1987 | Plume |
| 4,709,374 A | 11/1987 | Farrow |
| 4,800,573 A | 1/1989 | Cupo |
| 4,829,543 A | 5/1989 | Borth et al. |
| 4,835,790 A | 5/1989 | Yoshida et al. |
| 4,847,864 A | 7/1989 | Cupo |
| 4,860,315 A | 8/1989 | Hosoda et al. |
| 4,878,030 A | 10/1989 | Vincze |
| 4,896,369 A | 1/1990 | Adams et al. |
| 4,918,708 A | 4/1990 | Pottinger et al. |
| 4,992,747 A | 2/1991 | Myers |
| 4,993,047 A | 2/1991 | Moffatt et al. |
| 5,043,734 A | 8/1991 | Niho |
| 5,088,110 A | 2/1992 | Bonnerot et al. |
| 5,111,155 A | 5/1992 | Keate et al. |
| 5,121,414 A | 6/1992 | Levine et al. |
| 5,199,047 A | 3/1993 | Koch |
| 5,206,886 A | 4/1993 | Bingham |
| 5,206,889 A | 4/1993 | Unkrich |
| 5,221,908 A | 6/1993 | Katz et al. |
| 5,229,765 A | 7/1993 | Gardner |
| 5,233,632 A | 8/1993 | Baum et al. |
| 5,237,292 A | 8/1993 | Chethik |
| 5,285,474 A | 2/1994 | Chow et al. |
| 5,285,480 A | 2/1994 | Chennakeshu et al. |
| 5,317,599 A | 5/1994 | Obata |
| 5,329,311 A | 7/1994 | Ward et al. |
| 5,337,014 A | 8/1994 | Najle et al. |
| 5,353,307 A | 10/1994 | Lester et al. |
| 5,412,325 A | 5/1995 | Meyers |
| 5,430,770 A | 7/1995 | Abbey |
| 5,450,623 A | 9/1995 | Yokoyama et al. |
| 5,467,197 A | 11/1995 | Hoff |
| 5,471,508 A | 11/1995 | Koslov |
| 5,493,307 A | 2/1996 | Tsujimoto |
| 5,513,215 A | 4/1996 | Marchetto et al. |
| 5,555,257 A | 9/1996 | Dent |
| 5,577,067 A | 11/1996 | Zimmerman |
| 5,577,087 A | 11/1996 | Furuya |
| 5,579,344 A | 11/1996 | Namekata |
| 5,581,229 A | 12/1996 | Hunt |
| 5,592,481 A | 1/1997 | Wiedeman et al. |
| 5,602,868 A | 2/1997 | Wilson |
| 5,603,084 A | 2/1997 | Henry et al. |
| 5,606,286 A | 2/1997 | Bains |
| 5,608,331 A | 3/1997 | Newberg et al. |
| 5,625,640 A | 4/1997 | Palmer et al. |
| 5,642,358 A | 6/1997 | Dent |
| 5,644,592 A | 7/1997 | Divsalar et al. |
| 5,646,935 A | 7/1997 | Ishikawa et al. |
| 5,648,955 A | 7/1997 | Jensen et al. |
| 5,671,253 A | 9/1997 | Stewart |
| 5,732,113 A | 3/1998 | Schmidl et al. |
| 5,790,555 A | 8/1998 | Narahashi et al. |
| 5,793,818 A | 8/1998 | Claydon et al. |
| 5,799,010 A | 8/1998 | Lomp et al. |
| 5,815,531 A | 9/1998 | Dent |
| 5,819,157 A | 10/1998 | Ben-Efraim et al. |
| 5,828,710 A | 10/1998 | Beale |
| 5,848,060 A | 12/1998 | Dent |
| 5,870,439 A | 2/1999 | Ben-Efraim et al. |
| 5,870,443 A | 2/1999 | Rahnema |
| 5,903,546 A | 5/1999 | Ikeda et al. |
| 5,909,454 A | 6/1999 | Schmidt |
| 5,937,004 A | 8/1999 | Fasulo et al. |
| 5,940,025 A | 8/1999 | Koehnke et al. |
| 5,940,750 A | 8/1999 | Wang |
| 5,946,625 A | 8/1999 | Hassan et al. |
| 5,952,834 A | 9/1999 | Buckley |
| 5,956,373 A | 9/1999 | Goldston et al. |
| 5,960,040 A | 9/1999 | Cai et al. |
| 5,963,845 A | 10/1999 | Floury et al. |
| 5,966,048 A | 10/1999 | Thompson |
| 5,966,186 A | 10/1999 | Shigihara et al. |
| 5,966,412 A | 10/1999 | Ramaswamy |
| 5,970,098 A | 10/1999 | Herzberg |
| 5,970,156 A | 10/1999 | Hummelgaard et al. |
| 5,970,429 A | 10/1999 | Martin |
| 5,978,652 A | 11/1999 | Burr et al. |
| 5,987,068 A | 11/1999 | Cassia et al. |
| 5,987,069 A | 11/1999 | Furukawa et al. |
| 5,995,536 A | 11/1999 | Arkhipkin et al. |
| 5,995,832 A | 11/1999 | Mallinckrodt |
| 5,999,793 A | 12/1999 | Ben-Efraim et al. |
| 6,002,713 A | 12/1999 | Goldstein et al. |
| 6,008,692 A | 12/1999 | Escartin |
| 6,018,556 A | 1/2000 | Janesch et al. |
| 6,021,159 A | 2/2000 | Nakagawa |
| 6,028,894 A | 2/2000 | Oishi et al. |
| 6,032,026 A | 2/2000 | Seki et al. |
| 6,034,952 A | 3/2000 | Dohi et al. |
| 6,049,566 A | 4/2000 | Saunders et al. |
| 6,052,586 A | 4/2000 | Karabinis |
| 6,055,278 A | 4/2000 | Ho et al. |
| 6,061,393 A | 5/2000 | Tsui et al. |
| 6,072,841 A | 6/2000 | Rahnema |
| 6,075,808 A | 6/2000 | Tsujimoto |
| 6,078,645 A | 6/2000 | Cai et al. |
| 6,084,919 A | 7/2000 | Kleider et al. |
| 6,104,747 A | 8/2000 | Jalloul et al. |
| 6,108,374 A | 8/2000 | Balachandran et al. |
| 6,125,148 A | 9/2000 | Frodigh et al. |
| 6,125,260 A | 9/2000 | Wiedeman et al. |
| 6,128,357 A | 10/2000 | Lu et al. |
| 6,131,013 A | 10/2000 | Bergstrom et al. |
| 6,134,282 A | 10/2000 | Ben-Efraim et al. |
| 6,140,809 A | 10/2000 | Doi |
| 6,141,534 A | 10/2000 | Snell et al. |
| 6,144,708 A | 11/2000 | Maruyama |
| 6,166,601 A | 12/2000 | Shalom et al. |
| 6,172,970 B1 | 1/2001 | Ling et al. |
| 6,177,836 B1 | 1/2001 | Young et al. |
| 6,178,158 B1 | 1/2001 | Suzuki et al. |
| 6,188,717 B1 | 2/2001 | Kaiser et al. |
| 6,192,088 B1 | 2/2001 | Aman et al. |
| 6,212,360 B1 | 4/2001 | Fleming et al. |
| 6,219,095 B1 | 4/2001 | Zhang et al. |
| 6,246,717 B1 | 6/2001 | Chen et al. |
| 6,249,180 B1 | 6/2001 | Maalej et al. |
| 6,266,534 B1 | 7/2001 | Raith et al. |
| 6,272,679 B1 | 8/2001 | Norin |
| 6,275,678 B1 | 8/2001 | Bethscheider et al. |
| 6,297,691 B1 | 10/2001 | Anderson et al. |
| 6,304,594 B1 | 10/2001 | Salinger |
| 6,307,435 B1 | 10/2001 | Nguyen et al. |

| | | |
|---|---|---|
| 6,313,885 B1 | 11/2001 | Patel et al. |
| 6,314,441 B1 | 11/2001 | Raghunath |
| 6,320,464 B1 | 11/2001 | Suzuki et al. |
| 6,320,919 B1 | 11/2001 | Khayrallah et al. |
| 6,325,332 B1 | 12/2001 | Cellier et al. |
| 6,330,336 B1 | 12/2001 | Kasama |
| 6,333,924 B1 | 12/2001 | Porcelli et al. |
| 6,335,951 B1 | 1/2002 | Cangiani et al. |
| 6,366,309 B1 | 4/2002 | Siegle |
| 6,369,648 B1 | 4/2002 | Kirkman |
| 6,377,116 B1 | 4/2002 | Mattsson et al. |
| 6,389,002 B1 | 5/2002 | Schilling |
| 6,404,819 B1 | 6/2002 | Gehlot |
| 6,411,659 B1 | 6/2002 | Liu et al. |
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Dietmar et al. |
| 6,515,713 B1 | 2/2003 | Nam |
| 6,529,715 B1 | 3/2003 | Kitko et al. |
| 6,535,497 B1 | 3/2003 | Raith |
| 6,535,801 B1 | 3/2003 | Geier et al. |
| 6,539,050 B1* | 3/2003 | Lee et al. .................. 375/146 |
| 6,556,639 B1 | 4/2003 | Goldston et al. |
| 6,574,235 B1 | 6/2003 | Arslan et al. |
| 6,577,353 B1 | 6/2003 | Welles et al. |
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,721,300 B1* | 4/2004 | Akiba et al. ............... 370/342 |
| 6,731,622 B1 | 5/2004 | Frank et al. |
| 6,731,698 B1 | 5/2004 | Yoshie |
| 6,731,700 B1 | 5/2004 | Yakhnich et al. |
| 6,745,050 B1 | 6/2004 | Forsythe et al. |
| 6,754,872 B2 | 6/2004 | Zhang et al. |
| 6,772,182 B1 | 8/2004 | McDonald et al. |
| 6,775,521 B1 | 8/2004 | Chen |
| 6,795,496 B1 | 9/2004 | Soma et al. |
| 6,803,814 B1 | 10/2004 | Krupezevic et al. |
| 6,809,587 B2 | 10/2004 | Ghannouchi et al. |
| 6,891,897 B1* | 5/2005 | Bevan et al. ............... 375/265 |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 | 1/2006 | Uesugi et al. |
| 6,999,510 B2 | 2/2006 | Batruni |
| 7,041,406 B2 | 5/2006 | Schuler et al. |
| 7,054,384 B1 | 5/2006 | Ma et al. |
| 7,073,116 B1 | 7/2006 | Settle et al. |
| 7,079,585 B1 | 7/2006 | Settle et al. |
| 7,154,958 B2 | 12/2006 | Dabak et al. |
| 7,173,981 B1 | 2/2007 | Chen et al. |
| 7,184,473 B2 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 2001/0012322 A1 | 8/2001 | Nagaoka et al. |
| 2001/0016926 A1 | 8/2001 | Riggle |
| 2001/0024479 A1 | 9/2001 | Samarasooriya |

| | | |
|---|---|---|
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0010001 A1 | 1/2002 | Dahlman et al. |
| 2002/0051435 A1 | 5/2002 | Giallorenzi et al. |
| 2002/0064173 A1 | 5/2002 | Watanabe |
| 2002/0067744 A1 | 6/2002 | Fujii et al. |
| 2002/0071506 A1 | 6/2002 | Lindquist et al. |
| 2002/0082792 A1 | 6/2002 | Bourde et al. |
| 2002/0126780 A1 | 9/2002 | Oshima et al. |
| 2002/0136327 A1 | 9/2002 | El-Gamal et al. |
| 2002/0154705 A1* | 10/2002 | Walton et al. ............... 375/267 |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0138040 A1 | 7/2003 | Rouphael et al. |
| 2003/0147472 A1 | 8/2003 | Bach et al. |
| 2003/0171102 A1 | 9/2003 | Yang |
| 2003/0185310 A1 | 10/2003 | Ketchum et al. |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1 | 1/2006 | Chen |
| 2006/0022747 A1 | 2/2006 | Chen et al. |
| 2006/0045191 A1 | 3/2006 | Vasanth et al. |
| 2006/0056541 A1 | 3/2006 | Chen et al. |
| 2007/0011716 A1 | 1/2007 | Koslov et al. |
| 2007/0121718 A1 | 5/2007 | Wang et al. |
| 2007/0297533 A1 | 12/2007 | Chitrapu et al. |

FOREIGN PATENT DOCUMENTS

| | | |
|---|---|---|
| CA | 2502924 | 5/2004 |
| DE | 3642213 | 12/1986 |
| EP | 0115218 | 8/1984 |
| EP | 0222076 | 8/1986 |
| EP | 0238822 | 9/1987 |
| EP | 0356096 | 2/1990 |
| EP | 0356096 A2 | 2/1990 |
| EP | 0491668 | 6/1992 |
| EP | 0874474 | 10/1998 |
| EP | 0929164 | 7/1999 |
| EP | 1011245 | 6/2000 |
| EP | 1054537 A1 | 11/2000 |
| EP | 1065854 | 1/2001 |
| EP | 1081903 A1 | 3/2001 |
| EP | 1335512 | 8/2003 |
| FR | 2696295 | 4/1994 |
| FR | 2724522 | 3/1996 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| JP | 2000-022659 | 1/2000 |
| JP | 2001069112 A | 3/2001 |
| JP | 2001-244832 | 9/2001 |
| JP | 2002118611 | 4/2002 |
| JP | 2002-300132 | 10/2002 |

| | | |
|---|---|---|
| KR | 10-2001-0019997 | 3/2001 |
| KR | 2001 0019997 | 3/2001 |
| TW | 318983 B | 11/1997 |
| TW | 362333 B | 6/1999 |
| TW | 391107 B | 5/2000 |
| TW | 435009 B | 5/2001 |
| TW | 451569 B | 8/2001 |
| TW | 462168 B | 11/2001 |
| TW | 499800 B | 8/2002 |
| TW | 502506 B | 9/2002 |
| WO | 9836467 | 8/1998 |
| WO | WO 99/00957 | 1/1999 |
| WO | WO 99/20001 | 4/1999 |
| WO | WO 99/23718 | 5/1999 |
| WO | WO 99/33203 | 7/1999 |
| WO | WO 00/79708 | 12/2000 |
| WO | WO 00/79753 | 12/2000 |
| WO | WO 01/13532 | 2/2001 |
| WO | WO 01/19013 | 3/2001 |
| WO | WO 01/39455 | 5/2001 |
| WO | WO 01/39456 | 5/2001 |
| WO | WO 01/80471 | 10/2001 |
| WO | WO 02/073817 | 9/2002 |
| WO | WO 03/105375 | 12/2003 |
| WO | WO 2005/074171 | 8/2005 |
| WO | WO 2005/086444 | 9/2005 |

OTHER PUBLICATIONS

Notice of Allowance dated Oct. 23, 2008 in U.S. Appl. No. 10/961,579, filed Oct. 8, 2004 by Ernest C. Chen.
Final Rejection dated Sep. 9, 2008 in U.S. Appl. No. 11/656,662, filed Jan. 22, 2007 by Ernest C. Chen et al.
EPO Communication dated Oct. 17, 2008 in European Patent Application No. 03774848.0 filed Oct. 15, 2003 by Ernest C. Chen et al.
EPO Communication dated Nov. 18, 2008 in European Patent Application No. 03742393.6 filed Jul. 3, 2003 by Ernest C. Chen et al.
Non-final Office Action dated Dec. 3, 2008 in U.S. Appl. No. 10/913,927, filed Aug. 5, 2004 by Ernest C. Chen.
Notice of Allowance dated Dec. 2, 2008 in U.S. Appl. No. 11/656,662, filed Jan. 22, 2007 by Ernest C. Chen et al.
Canadian Office Action dated Aug. 18, 2008 in Canadian Patent Application No. 2503532 filed Oct. 17, 2003 by Ernest C. Chen et al.
EPO Summons to Oral Proceedings dated Jul. 18, 2008 in European Patent Application No. 02728894.3 filed Apr. 24, 2002 by Ernest C. Chen.
Taiwan Office Action dated May 14, 2008 in Taiwan Patent Application No. 092129629 filed Oct. 24, 2003 by Paul Anderson et al.
Chinese Office Action dated Aug. 22, 2008 in Chinese Patent Application No. 200410100591.6 filed Oct. 10, 2004 by Ernest C. Chen.
Non-final Office Action dated Dec. 16, 2008 in U.S. Appl. No. 12/176,533, filed Jul. 21, 2008 by Ernest C. Chen et al.
Scott, R. P. et al.; Ultralow Phase Noise Ti:sapphire Laser Rivals 100 MHz Crystal Oscillator; Nov. 11-15, 2001; IEEE-Leos; pp. 1-2.
Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.
Non-final Communication dated Apr. 1, 2008 in U.S. Appl. No. 10/961,579, filed Oct. 8, 2004 by Ernest Chen.
Notice of Allowance dated Mar. 25, 2008 in U.S. Appl. No. 11/653,517, filed Jan. 16, 2007 by Ernest C. Chen.
EPO Communication dated Mar. 11, 2008 in European counterpart Application No. 03777694.5 of corresponding U.S. Appl. No. 10/532,509, filed Oct. 17, 2003 by Ernest Chen et al., now issued as Patent No. 7,230,480.
EPO Communication dated Mar. 7, 2008 in European counterpart Application No. 03742393.6 of corresponding U.S. Appl. No. 10/519,375, filed Jul. 3, 2003 by Ernest Chen et al.
Japanese Office Action dated Mar. 4, 2008 in Japanese counterpart Application No. 2004-297297 of corresponding U.S. Appl. No. 10/962,346, filed Oct. 8, 2004 by Ernest Chen.

Non-final Communication dated Mar. 3, 2008 in U.S. Appl. No. 11/656,662, filed Jan. 22, 2007 by Ernest C. Chen et al.
Norwegian Office Action dated Nov. 15, 2007 in Norwegian counterpart Application No. 20026115 of corresponding U.S. Appl. No. 09/844,401, filed Apr. 27, 2001 by Ernest C. Chen, now Patent No. 7,209,524.
Non-final Communication dated Oct. 16, 2007 in U.S. Appl. No. 10/962,346, filed Oct. 8, 2004 by Ernest Chen.
Notice of Allowance dated Sep. 20, 2007 in U.S. Appl. No. 10/692,539, filed Oct. 24, 2003 by Ernest Chen.
Canadian Office Action dated Sep. 12, 2007 in Canadian counterpart Application No. 2491259 of corresponding U.S. Appl. No. 10/519,375, filed Jul. 3, 2003 by Ernest C. Chen et al.
EPO Communication dated Aug. 3, 2007 in European counterpart application No. 03794510.2 of corresponding U.S. Appl. No. 10/236,414, filed Sep. 6, 2002 by Ernest C. Chen et al.
Non-final Communication dated May 31, 2007 in U.S. Appl. No. 10/692,539, filed Oct. 24, 2003 by Ernest Chen.
Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.
Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.
Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.
Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.
Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.
Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.
Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.
Ramchandran, Kannan et al.: Multiresolution Broadcast for Digital HDTV Using Joint Source/Channel Coding, IEEE, vol. 11, No. 1, Jan. 1993, pp. 6-22.
Meyr, Heinrich et al.; "Digital Communication Receivers—Synchronization, Channel Estimation, and Signal Processing"; John Wiley & Sons, Inc.; 1998; pp. 212-213 and 217-218; XP 002364874.
Meyr, Heinrich et al.; "Digital Communication Receivers—Synchronization, Channel Estimation, and Signal Processing"; John Wiley & Sons, Inc.; 1998; pp. 610-612; XP002364876.
Chinese Office Action dated Aug. 22, 2008 in Chinese Application No. 200410100591.6, referencing Chinese Patent CN1285984A (corresponding to US Patent No. 6,275,678 (Bethscheider et al.), which was cited by IDS on Apr. 19, 2006).
Notice of Allowance dated Oct. 23, 2008 in U.S. Appl. No. 10/962,346, filed Oct. 8, 2004 by Ernest C. Chen.
Canadian Office Action dated Aug. 5, 2008 in Canadian counterpart Application No. 2503532 corresponding to U.S. Appl. No. 10/532,509, filed Oct. 17, 2003 by Ernest C. Chen et al., now issued Jun. 12, 2007 as US Patent No. 7,230,480.
Notice of Allowance dated Jun. 2, 2008 in U.S. Appl. No. 10/691,032, filed Oct. 22, 2003 by Weizheng W. Wang et al.

Notice of Allowance dated Jun. 2, 2008 in U.S. Appl. No. 10/693,135, filed Oct. 24, 2003 by Ernest C. Chen.

Canadian Office Action dated Jan. 22, 2008 in Canadian counterpart Application No. 2487817 corresponding to US Application Serial No. 10/165,710, filed Jun. 7, 2002 by Ernest C. Chen.

Canadian Office Action dated Jan. 23, 2008 in Canadian counterpart Application No. 2484313 corresponding to U.S. Appl. No. 10/962,346, filed Oct. 8, 2004 by Ernest C. Chen.

Canadian Office Action dated Feb. 5, 2008 in Canadian counterpart Application No. 2503530 corresponding to U.S. Appl. No. 10/532,632, filed Apr. 25, 2005 by Ernest C. Chen et al.

Canadian Office Action dated Feb. 27, 2008 in Canadian counterpart Application No. 2515167 corresponding to U.S. Appl. No. 10/913,927, filed Aug. 5, 2004 by Ernest C. Chen.

EPO Summons to attend Oral Proceedings dated Jul. 18, 2008 in European counterpart Application No. 02728894.3 corresponding to U.S. Appl. No. 09/844,401, filed Apr. 27, 2001 by Ernest Chen, now issued Apr. 24, 2007 as US Patent No. 7,209,524.

Taiwanese Office Action dated Mar. 14, 2008 in Taiwan counterpart Application No. 092129629 corresponding to U.S. Appl. No. 10/532,631, filed Apr. 25, 2005 by Paul R. Anderson et al.

Non-final Office Action dated Apr. 30, 2008 in U.S. Appl. No. 10/962,346, filed Oct. 8, 2004 by Ernest C. Chen.

Final Rejection dated Jun. 24, 2008 in U.S. Appl. No. 10/519,375, filed Dec. 22, 2004 by Ernest C. Chen et al.

Non-Final Office Action dated Jun. 17, 2008 in U.S. Appl. No. 10/913,927, filed Aug. 5, 2004 by Ernest C. Chen.

European Search Report and Search Opinion dated Jun. 13, 2008 in European counterpart Application No. 07075745.5 corresponding to U.S. Appl. No. 09/844,401, filed Apr. 27, 2001 by Ernest C. Chen, now issued Apr. 24, 2007 as US Patent No. 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalart, Pascal; LeClerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

Canadian Office Action dated Apr. 22, 2008 in Canadian counterpart Application No. 2502924 corresponding to U.S. Appl. No. 10/532,619, filed Apr. 25, 2005 by Ernest C. Chen.

Notice of Allowance dated Jun. 13, 2008 in U.S. Appl. No. 10/532,524, filed Apr. 25, 2005 by Ernest C. Chen et al.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

EPO Communication dated May 6, 2008 in European counterpart Application No. 03774848.0 corresponding to U.S. Appl. No. 10/532,582, filed Apr. 25, 2005 by Ernest C. Chen et al., now issued Feb. 6, 2007 as US Patent No. 7,173,977.

EPO Communication dated May 6, 2008 in European counterpart Application No. 03777627.5 corresponding to U.S. Appl. No. 10/532,619, filed Apr. 25, 2005 by Ernest C. Chen.

Notice of Allowance dated May 22, 2008 in U.S. Appl. No. 10/532,619 filed Apr. 25, 2005 by Ernest C. Chen.

Notice of Allowance dated May 6, 2008 in U.S. Appl. No. 10/532,631 filed Apr. 25, 2005 by Paul R. Anderson et al.

Non-final Office Action dated Apr. 30, 2008 in U.S. Appl. No. 11/603,776 filed Nov. 22, 2006 by Ernest C. Chen et al.

Notice of Allowance dated Apr. 30, 2008 in U.S. Appl. No. 11/603,776, filed Nov. 22, 2006 by Ernest C. Chen et al.

EPO Communication dated Apr. 4, 2008 in European counterpart Application No. 03757359.9 corresponding to U.S. Appl. No. 10/165,710, filed Jun. 7, 2002 by Ernest C. Chen.

Notice of Allowance dated Mar. 12, 2008 in U.S. Appl. No. 11/655,001, filed Jan. 18, 2007 by Weizheng Wang et al.

Japanese Office Action dated Mar. 4, 2008 in Japanese counterpart Application No. 2004-297297 corresponding to U.S. Appl. No. 10/962,346, filed Oct. 8, 2004 by Ernest C. Chen.

EPO Communication dated Feb. 26, 2008 in European counterpart Application No. 04256234.8 corresponding to U.S. Appl. No. 10/962,346, filed Oct. 8, 2004 by Ernest C. Chen.

Notice of Allowance dated May 8, 2008 in U.S. Appl. No. 11/619,173, filed Jan. 2, 2007 by Ernest C. Chen et al.

Notice of Allowance dated Apr. 21, 2008 in U.S. Appl. No. 10/519,322, filed Dec. 23, 2004 by Ernest C. Chen et al.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

Non-final Communication dated Dec. 27, 2007 in U.S. Appl. No. 10/519,375, filed Dec. 22, 2004 by Ernest C. Chen et al.

Non-final Communication dated Dec. 11, 2007 in U.S. Appl. No. 10/913,927, filed Aug. 5, 2004 by Ernest C. Chen.

Non-final Communication dated Nov. 15, 2007 in U.S. Appl. No. 11/619,173, filed Jan. 2, 2007 by Ernest C. Chen et al.

Non-final Communication dated Nov. 19, 2007 in U.S. Appl. No. 10/532,631, filed Apr. 25, 2005 by Paul R. Anderson et al.

Non-final Communication dated Nov. 16, 2007 in U.S. Appl. No. 10/691,032, filed Oct. 22, 2003 by Weizheng Wang et al.

Notice of Allowance dated Dec. 11, 2007 in U.S. Appl. No. 10/519,322, filed Dec. 23, 2004 by Ernest C. Chen et al.

Notice of Allowance dated Dec. 26, 2007 in U.S. Appl. No. 10/532,619, filed Apr. 25, 2005 by Ernest C. Chen.

Notice of Allowance dated Jan. 2, 2008 in U.S. Appl. No. 11/603,776, filed Nov. 22, 2006 by Ernest C. Chen et al.

Notice of Allowance dated Sep. 6, 2007 in U.S. Appl. No. 10/692,491, filed Oct. 24, 2003 by Ernest C. Chen.

Notice of Allowance dated Aug. 29, 2007 in U.S. Appl. No. 11/603,776, filed Nov. 22, 2006 by Ernest C. Chen et al.

Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.

Notice of Allowance dated Jun. 20, 2007 in U.S. Appl. No. 10/693,135, filed Oct. 24, 2003 by Ernest C. Chen.

Chen, Ernest et al.; "DVB-S2 Backward-Compatible Modes: A Bridge Between the Present and the Future"; International Journal of Satellite Communications and Networking; vol. 22, Issue 3; pp. 341-365; published 2004 by John Wiley & Sons, Ltd.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

EPO Communication dated Feb. 24, 2009 in European Patent Divisional Application No. 07075745.5 filed Apr. 24, 2002 (parent filing date) by Ernest C. Chen.

Canadian Office Action dated Oct. 3, 2008 in Canadian Patent Application No. 2491259 filed Jul. 3, 2003 by Ernest C. Chen et al.

Israel Office Action dated Feb. 15, 2009 in Israel Patent Application No. 164482 filed Oct. 10, 2004 by Ernest C. Chen.

Non-final Office Action dated Mar. 5, 2009 in U.S. Appl. No. 10/519,375, filed Dec. 22, 2004 by Ernest C. Chen et al.

Notice of Allowance dated Apr. 13, 2009 in U.S. Appl. No. 12/176,533, filed Jul. 21, 2008 by Ernest C. Chen et al.

Notice of Allowance dated Jul. 13, 2009 in U.S. Appl. No. 10/913,927, filed Aug. 5, 2004 by Ernest C. Chen.

ROC (Taiwan) Search Report dated Apr. 3, 2009 in ROC (Taiwan) Patent Application No. 092129498 filed Oct. 24, 2003 by Ernest C. Chen et al.

ROC (Taiwan) Search Report dated Apr. 3, 2009 in ROC (Taiwan) Patent Application No. 092117948 filed Jul. 1, 2003 by Ernest C. Chen et al.

ROC (Taiwan) Search Report completed May 30, 2009 in ROC (Taiwan) Patent Application No. 092129644 filed Oct. 24, 2003 by Ernest C. Chen, 1 page.

Canadian Office Action dated Sep. 17, 2009 in Canadian Patent Application No. 2503432 filed Oct. 20, 2003 by Paul R. Anderson et al.

EPO Summons to attend oral proceedings dated Sep. 16, 2009 in European Patent Application No. 03757359.9 filed Jun. 5, 2003 by Ernest C. Chen.

Reverse Decision on Appeal dated Aug. 19, 2009 in U.S. Appl. No. 10/236,414 filed Sep. 6, 2002 by Ernest C. Chen et al.

Notice of Allowance dated Sep. 15, 2009 in U.S. Appl. No. 10/519,375 filed Jul. 3, 2003 by Ernest C. Chen et al.

Canadian Office action dated Nov. 16, 2009 in Canadian Patent Application No. 2,489,569 filed Jul. 1, 2003 by Ernest C. Chen et al.

* cited by examiner

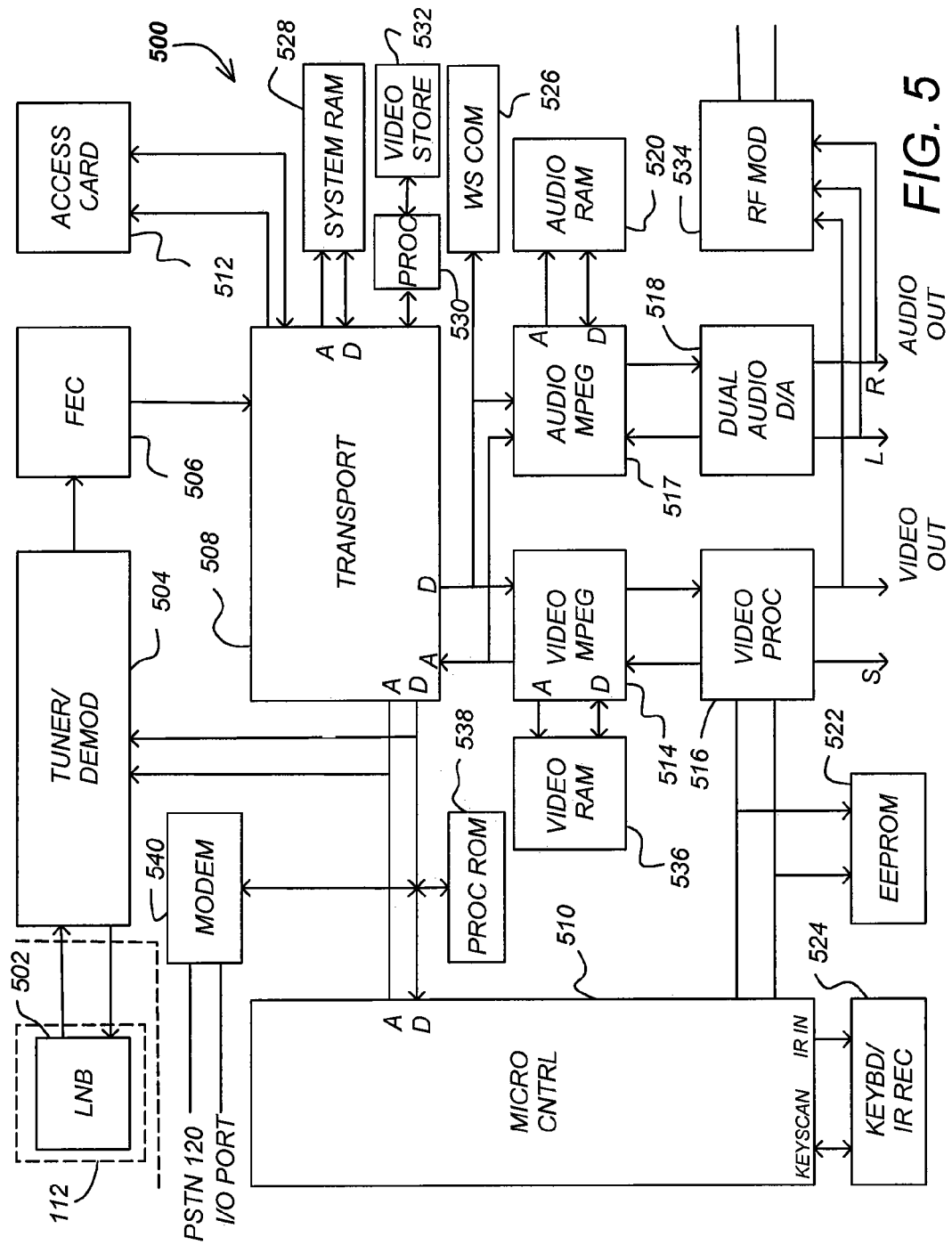

LOWER COMPLEXITY LAYERED MODULATION SIGNAL PROCESSOR

CROSS-REFERENCE TO RELATED APPLICATIONS

This application is a continuation of U.S. patent application Ser. No. 10/532,632, entitled "LOWER COMPLEXITY LAYERED MODULATION SIGNAL PROCESSOR," by Ernest C. Chen, et al., filed Apr. 25, 2005; which is a National Stage Application of PCT Application Number PCT/US2003/032264, entitled "LOWER COMPLEXITY LAYERED MODULATION SIGNAL PROCESSOR," by Ernest C. Chen, et al., filed Oct. 10, 2003; which application claims benefit of U.S. Provisional Patent Application No. 60/421,331, entitled "LOWER COMPLEXITY LAYERED MODULATION SIGNAL PROCESSOR," by Ernest C. Chen, et al., filed Oct. 25, 2002; and which, is also a continuation-in-part of U.S. patent application Ser. No. 09/844,401, filed Apr. 27, 2001, by Ernest C. Chen, entitled "LAYERED MODULATION FOR DIGITAL SIGNALS," now issued as U.S. Pat. No. 7,209,524, all of which applications are hereby incorporated by reference herein.

BACKGROUND OF THE INVENTION

1. Field of the Invention

The present invention relates to systems and methods for transmitting and receiving data, and in particular to a system and method for transmitting and receiving data with lower complexity equipment.

2. Description of the Related Art

Digital signal communication systems have been used in various fields, including digital TV signal transmission, either terrestrial or satellite. As digital signal communication systems and services evolve, there is a burgeoning demand for increased data throughput and added services. However, it is more difficult to implement either improvement in old systems or new services when it is necessary to replace existing legacy hardware, such as transmitters and receivers. New systems and services are at an advantage when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted utilizing 8PSK or 16QAM modulation.

It is advantageous for systems and methods of transmitting signals to accommodate enhanced and increased data throughput without requiring additional frequency. It is also advantageous for enhanced and increased throughput signals for new receivers to be backwards compatible with legacy receivers. There is further advantage for systems and methods which allow transmission signals to be upgraded from a source separate from the legacy transmitter.

It has been proposed that a layered modulation signal, transmitting non-coherently upper as well as lower layer signals, be employed to meet these needs. Such layered modulation systems allow higher information throughput with backwards compatibility. However, even when backward compatibility is not required (such as with an entirely new system), layered modulation can still be advantageous because it requires a TWTA peak power significantly lower than that for conventional 8PSK or 16QAM modulation formats for a given throughput.

However, a significant roadblock associated with implementing a layered modulation is the requirement for the use of a separate forward error correction (FEC) routine and implementing circuitry for each layer. This requirement increases the complexity of the associated transmission and reception systems and also increases the overall cost. What is needed is a system and method for transmitting and receiving such signals without need for multiple encoders/decoders. The present invention satisfies this need.

SUMMARY OF THE INVENTION

To address the requirements described above, the present invention discloses a method and apparatus for transmitting and receiving a coded signal having an upper layer signal and a lower layer signal. The method comprises the steps of combining the upper layer signal and the lower layer signal, encoding the combined upper layer signal and lower layer signal, delaying the upper layer signal, modulating the delayed upper layer signal, modulating the lower layer signal, transmitting the delayed upper layer signal and transmitting the lower layer signal. The apparatus comprises an encoder, for encoding a combined upper layer signal and lower layer signal, a delay element, communicatively coupled to the encoder, for delaying the upper layer signal, a first modulator, for modulating the delayed upper layer signal, a second modulator, for modulating the lower layer signal, a transmitter, communicatively coupled to the first modulator, for transmitting the delayed upper layer signal, and a second transmitter, communicatively coupled to the second modulator, for transmitting the lower layer signal.

BRIEF DESCRIPTION OF THE DRAWINGS

Referring now to the drawings in which like reference numbers represent corresponding parts throughout:

FIG. 5 is a block diagram of an integrated receiver/decoder;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Video Distribution System

Figure 1:
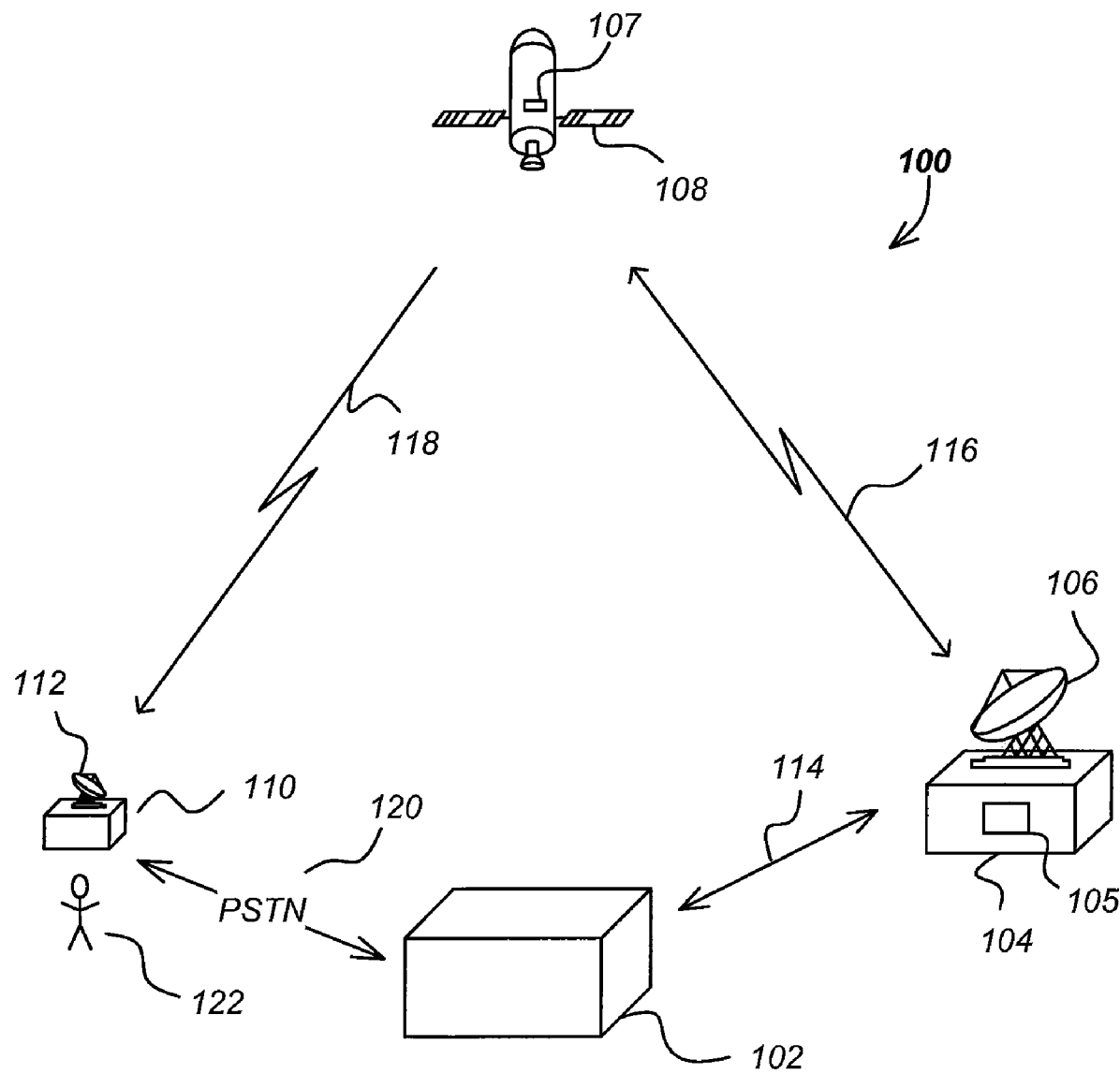
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer such services as pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter or transponder 107. The subscriber receiving station 110 receives this information using outdoor unit (ODU) 112, which includes a subscriber antenna and a low noise block converter (LNB).

In one embodiment, the subscriber receiving station antenna is an 18-inch, slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna. This minimizes attenuation of the incoming microwave signal.

The video distribution system 100 can comprise a plurality of satellites 108 in order to provide wider terrestrial coverage, additional channels, or additional bandwidth per channel. In one embodiment of the invention, each satellite comprises 16 transponders which are utilized to receive and transmit program material and other control data from the uplink center 104 and provide it to the subscriber receiving stations 110. Using data compression and multiplexing techniques the with respect to channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, via broadcasting, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material (such as a movie), the foregoing method can be used to deliver program material comprising purely audio information or other data as well.

Uplink Configuration

Figure 2:
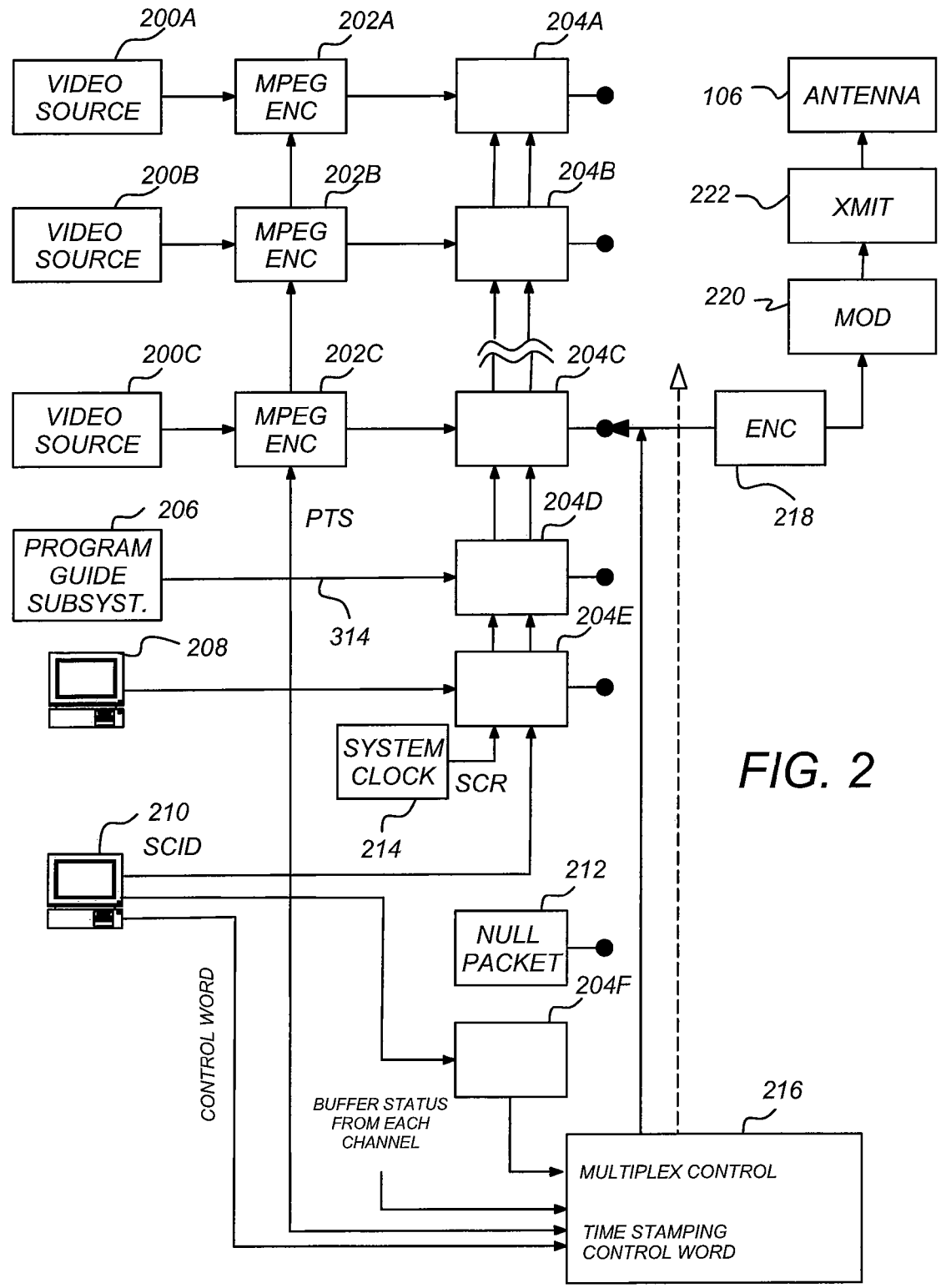
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A-200C [collectively referred to hereinafter as video source(s) 200]. The data from each video program source 200 is provided to an encoder 202A-202C [collectively referred to hereinafter as encoder(s) 202]. Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F [collectively referred to hereinafter as packetizer(s) 204] associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Broadcast Data Stream Format and Protocol

Figure 3A:
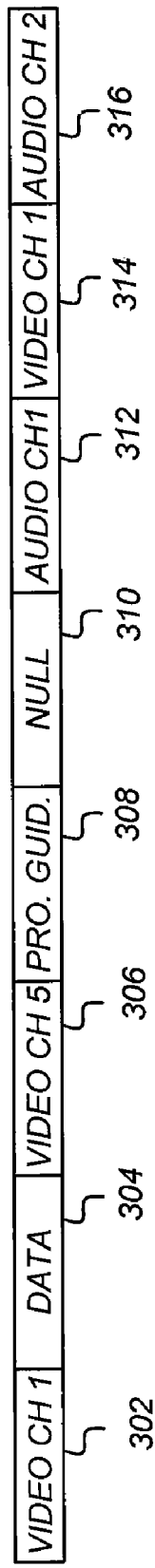
FIG. 3A is a diagram of a representative data stream.

FIG. 3A is a diagram of a representative data stream. The first packet segment 302 comprises information from video channel 1 (data coming from, for example, the first video program source 200A). The next packet segment 304 comprises computer data information that was obtained from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 310 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

Figure 3B:
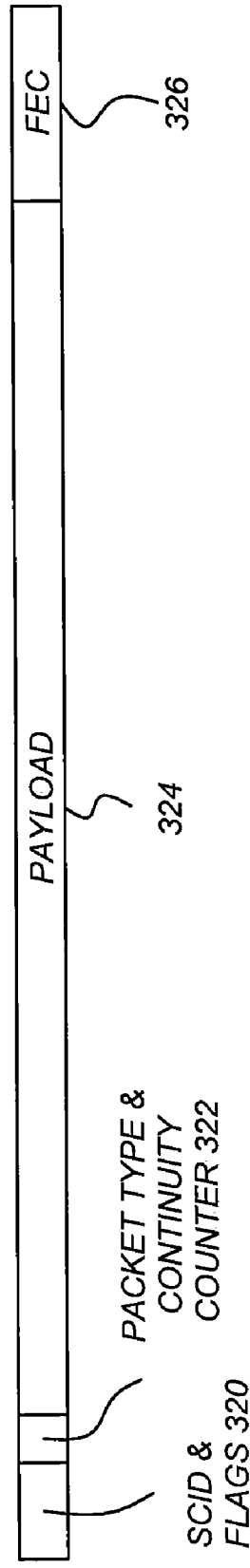
FIG. 3B is a diagram of a representative data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306, represents a portion of the video program provided by the video program source 200. The final packet segment 326, is data required to perform forward error correction.

Figure 4:
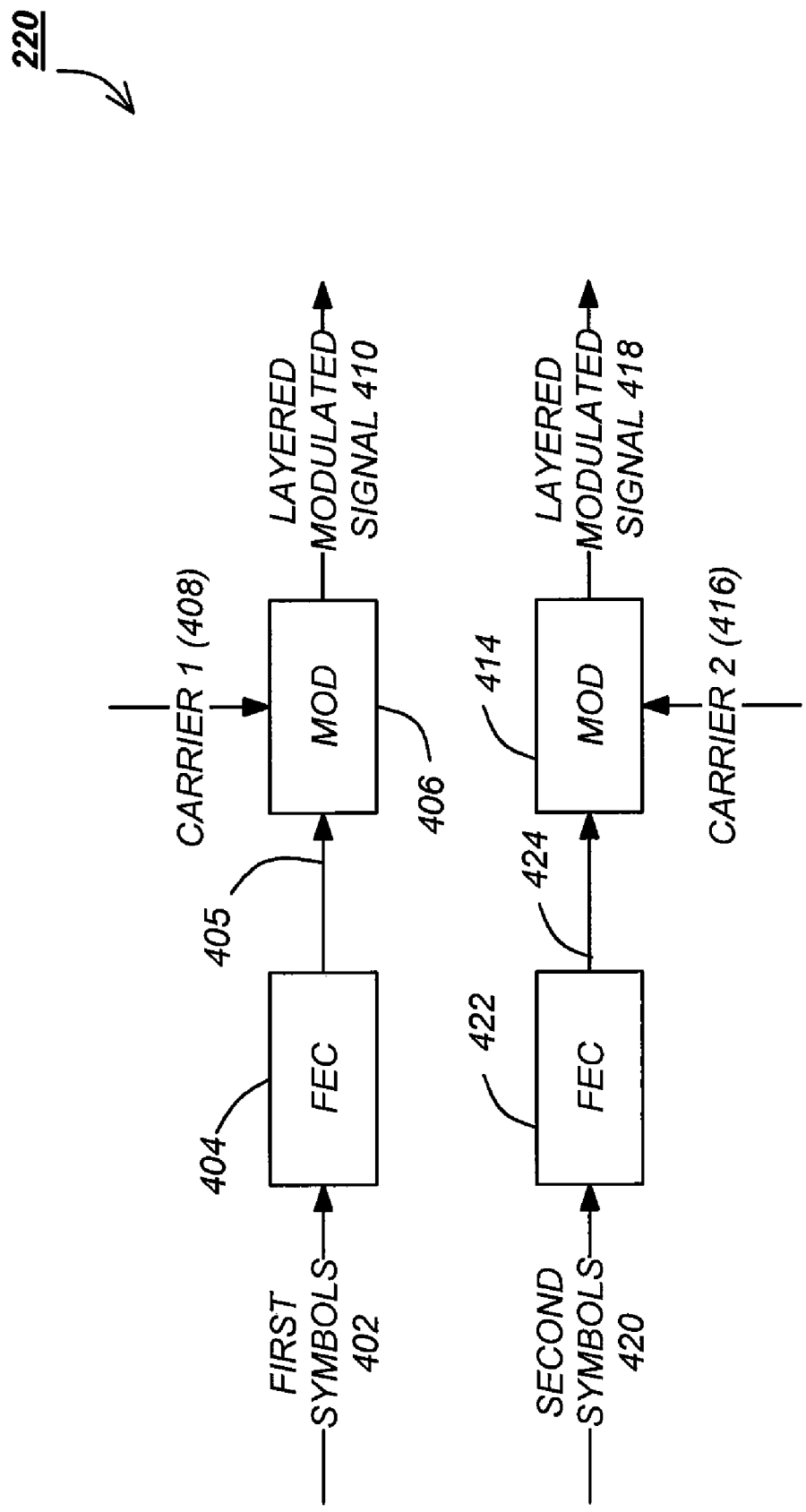
FIG. 4 is a block diagram showing one embodiment of the modulator.

FIG. 4 is a block diagram showing one embodiment of the modulator 220. The modulator 220 optionally comprises a forward error correction (FEC) encoder 404 which accepts the first signal symbols 402 and adds redundant information used to reduce transmission errors. The coded symbols 405 are modulated by modulator 406 according to the first carrier 408 to produce the upper layer modulated signal 410. Second symbols 420 are likewise provided to the optional second FEC encoder 422 to produce the coded second symbols 422. The coded second symbols 422 are provided to second modulator 414, which modulates the coded second signals according to the second carrier 416 to produce a lower layer modulated signal 418. The upper layer modulated signal 410 and the lower layer modulated signal 418 are therefore uncorrelated. The upper layer signal 410, however, must be a sufficiently greater amplitude signal than the lower layer signal 418, to maintain the signal constellations shown in FIG. 6 and FIG. 7.

Integrated Receiver/Decoder

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder, and converts the modulated data to a digital data stream. Further details regarding the demodulation of the received signal follow.

The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 functions as a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which in turn, converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention, both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital-to-analog (D/A) converter 518. In one embodiment of the present invention, the D/A converter 518 is a dual D/A converter, one channel for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may be supported. For example, other audio formats such as multi-channel DOLBY DIGITAL AC-3.

A description of the processes performed in the encoding and decoding of video streams, particularly with respect to MPEG and JPEG encoding/decoding can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read-only memory (ROM) 538, an electronically erasable programmable read-only memory (EEPROM) 522 or similar memory device. The microcontroller 510 also controls the other digital devices of the RD 500 via address and data lines (denoted "A" and "D" respectively, in FIG. 5).

The modem 540 connects to the customer's phone line via the PSTN port 120. The modem can be used to call the program provider and transmit customer purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. The video storage device 532 can be a hard disk drive, a read/writable compact disc or DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and/or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigial side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels, and advantageously, for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator as will be described in detail hereafter.

In a typical backwards-compatible embodiment of the present invention, the legacy QPSK signal is boosted in power to a higher transmission (and reception) level. This creates a power "room" in which a new lower layer signal may operate. The legacy receiver will not be able to distinguish the new lower layer signal, from additive white Gaussian noise, and thus, operates in the usual manner. The optimal selection of the layer power levels is based on accommodating the legacy equipment, as well as the desired new throughput and services.

The new lower layer signal is provided with a sufficient carrier to thermal noise ratio in order to function properly. The new lower layer signal and the boosted legacy signal are non-coherent with respect to one other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new advanced code such as a turbo code, or a low-density parity check (LDPC) code. The lower layer signal may even be an analog signal.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

Layered Signals

Figure 6B:
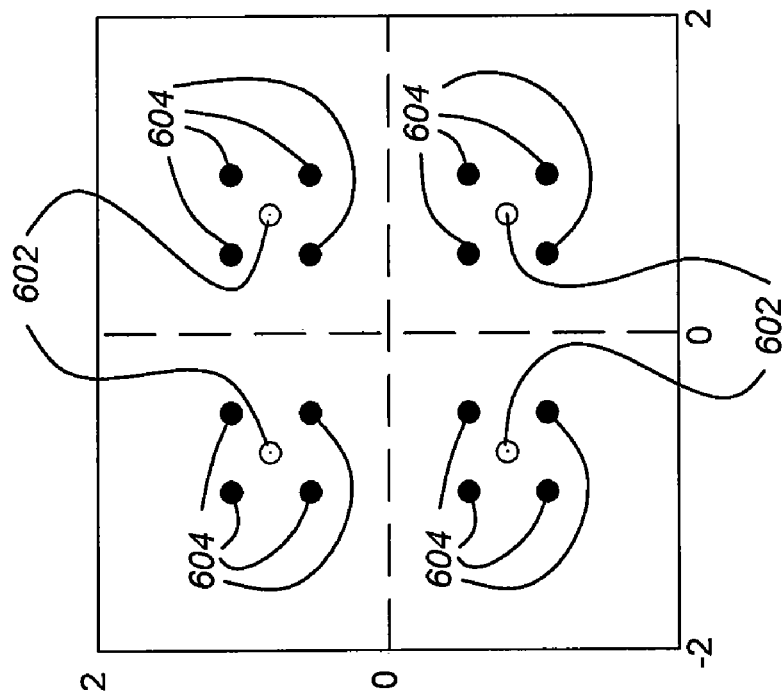
FIGS. 6A-6C are diagrams illustrating the basic relationship of signal layers in a layered modulation transmission.
Figure 6A:
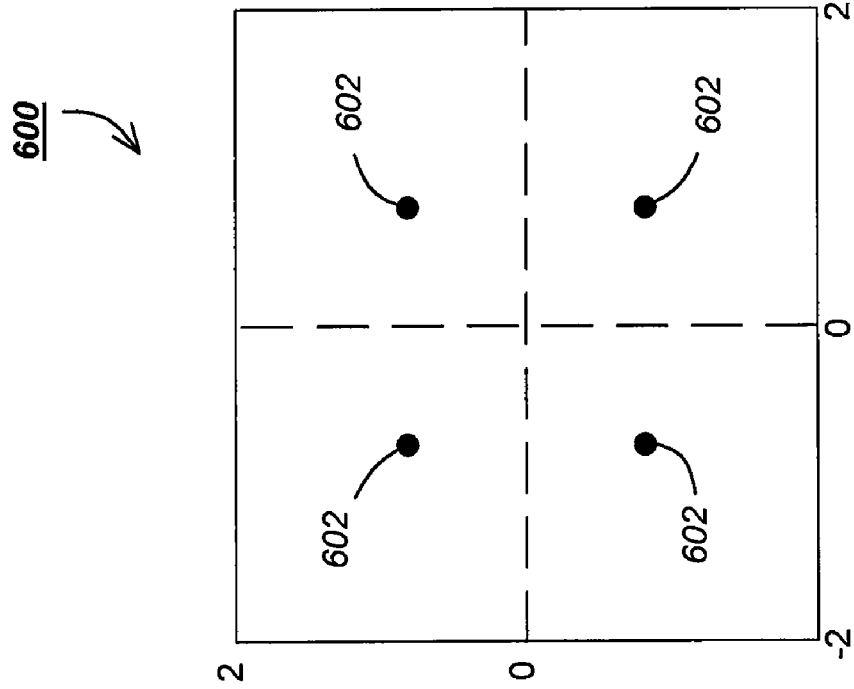
Figure 6C:
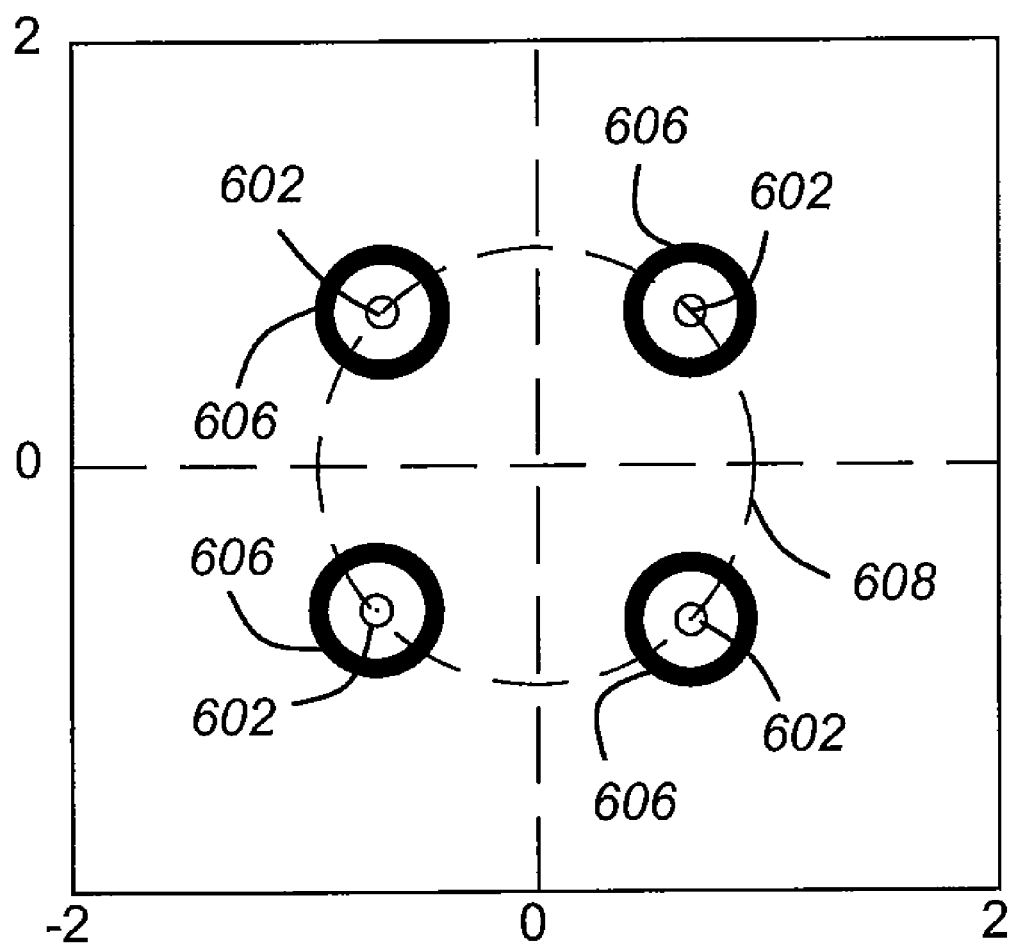

FIGS. 6A-6C illustrate the basic relationship of signal layers in a layered modulation transmission. FIG. 6A illustrates a first layer signal constellation 600 of a transmission signal showing the signal points or symbols 602. This signal constellation seen in FIG. 2B illustrates the second layer signal constellation of symbols 204 over the first layer signal constellation 200 where the layers are coherent. FIG. 2C illustrates a second signal layer 206 of a second transmission layer over the first layer constellation where the layers may be non-coherent. The second layer 206 rotates about the first layer constellation 202 due to the relative modulating frequencies of the two layers in a non-coherent transmission. Both the first and second layers rotate about the origin due to the first layer modulation frequency as described by path 208.

Figure 7B:
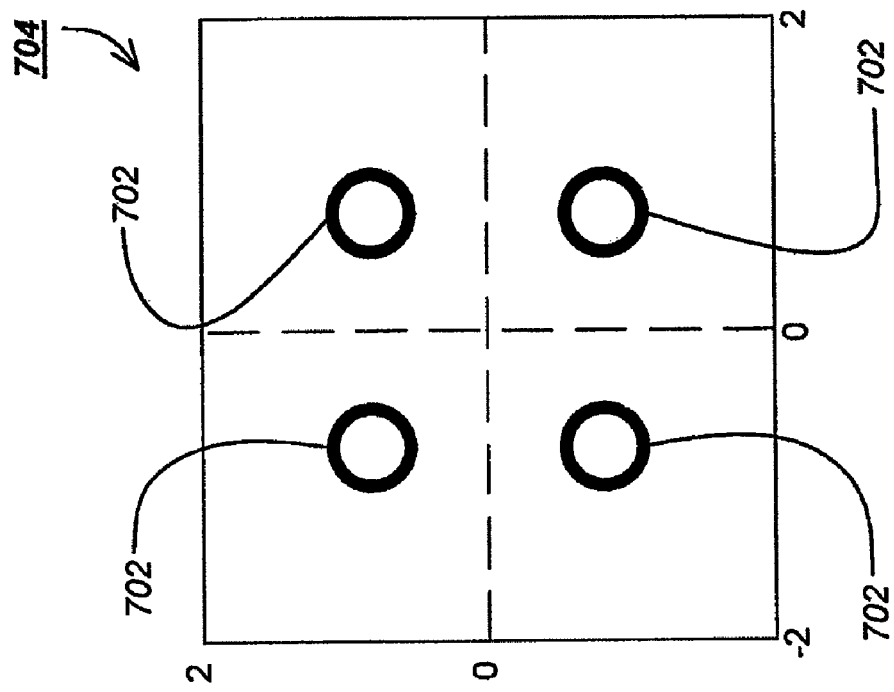
FIGS. 7A-7C are diagrams illustrating a signal constellation of a second transmission layer over the first transmission layer after first layer demodulation.
Figure 7A:
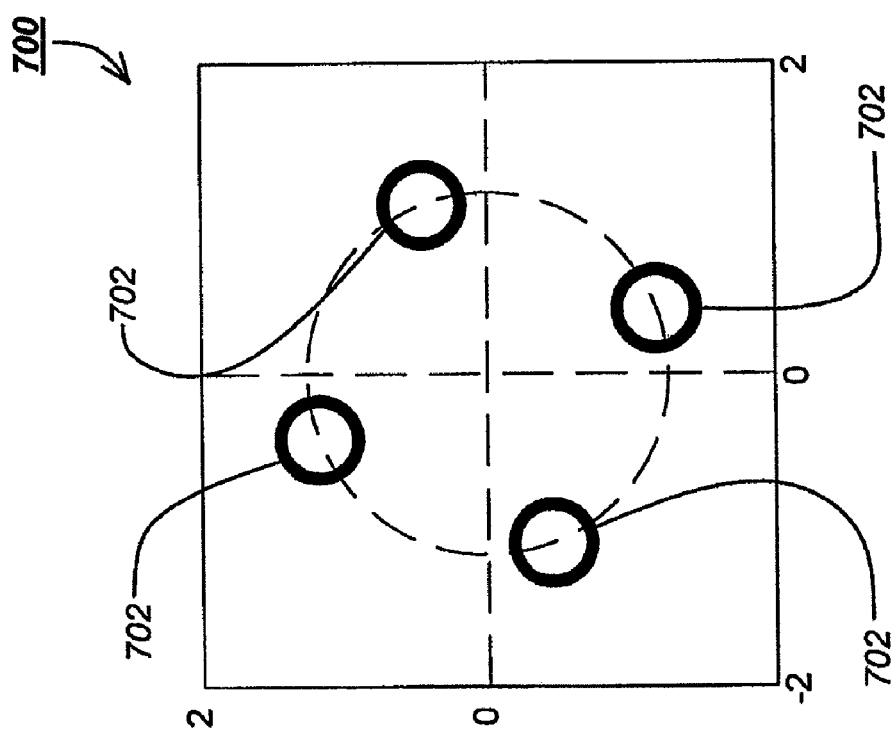
Figure 7C:
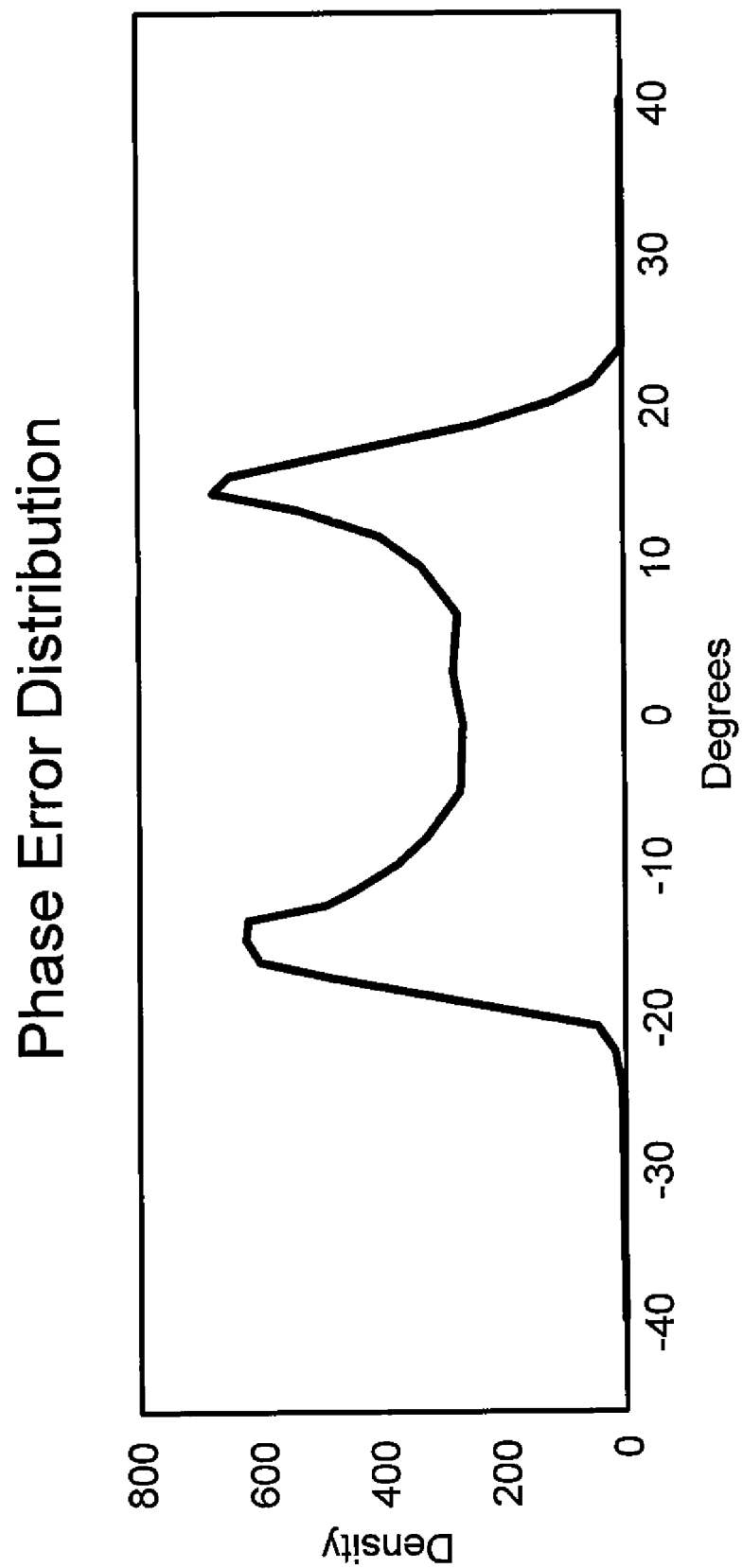

FIGS. 7A-7C are diagrams illustrating a signal constellation of a second transmission layer over the first transmission layer after first layer demodulation. FIG. 7A shows the constellation 700 before the first carrier recovery loop (CRL) and FIG. 7B shows the constellation 704 after CRL. In this case, the signal points of the second layer are actually rings 702. FIG. 7C depicts a phase distribution of the received signal with respect to nodes 602.

Relative modulating frequencies cause the second layer constellation to rotate around the nodes of the first layer constellation. After the second layer CRL this rotation is eliminated. The radius of the second layer constellation is determined by its power level. The thickness of the rings 702 is determined by the carrier to noise ratio (CNR) of the second layer. As the two layers are non-coherent, the second layer may also be used to transmit analog or digital signals.

Figure 8:
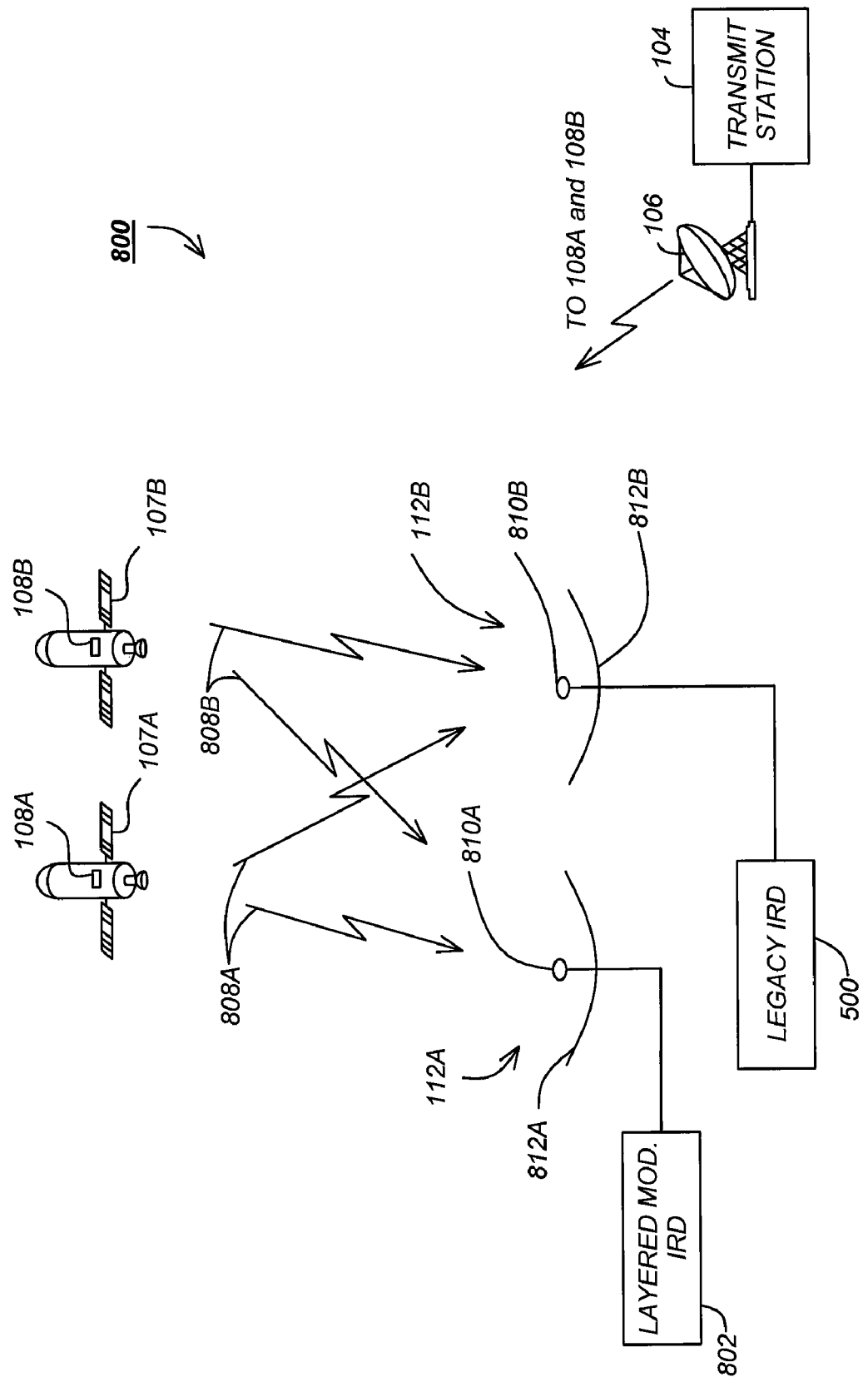
FIG. 8 is a diagram showing a system for transmitting and receiving layered modulation signals.

FIG. 8 is a diagram showing a system for transmitting and receiving layered modulation signals. Separate transmitters 107A, 107B, as may be located on any suitable platform, such as satellites 108A, 108B, are used to non-coherently transmit different layers of a signal of the present invention. Uplink signals are typically transmitted to each satellite 108A, 108B from one or more transmitters 105 via an antenna 106. The layered signals 808A, 808B (downlink signals) are received at receiver antennas 112A, 112B, such as satellite dishes, each with a low noise block (LNB) 812A, 812B where they are then coupled to integrated receiver/decoders (IRDs) 500, 802. Because the signal layers may be transmitted non-coherently, separate transmission layers may be added at any time using different satellites 108A, 108B or other suitable platforms, such as ground based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer.

Layered modulation applications include backwards compatible and non-backwards compatible applications. "Backwards compatible" in this sense, describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. However, as will be described hereafter, the legacy signals may be modified to optimally implement the new layers. The present invention may be applied to existing direct satellite services which are broadcast to individual users in order to enable additional features and services with new receivers without adversely affecting legacy receivers and without requiring additional signal bandwidth.

Demodulator and Decoder

Figure 9:
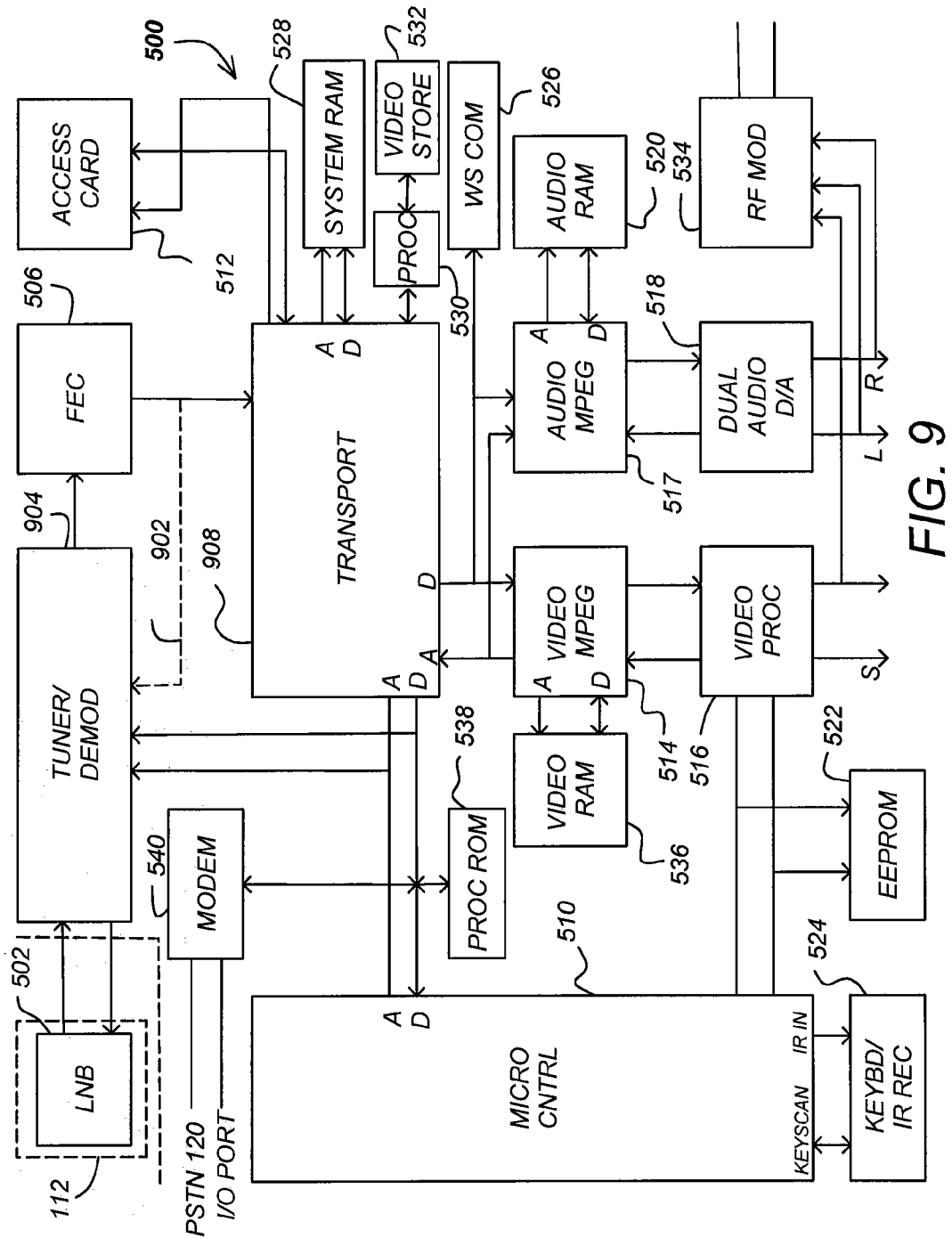
FIG. 9 is a block diagram depicting one embodiment of an enhanced receiver/decoder capable of receiving layered modulation signals.

FIG. 9 is a block diagram depicting one embodiment of an enhanced IRD 802 capable of receiving layered modulation signals. The enhanced IRD 802 includes a feedback path 902 in which the FEC decoded symbols are fed back to an enhanced modified tuner/demodulator 904 and transport module 908.

Figure 10A:
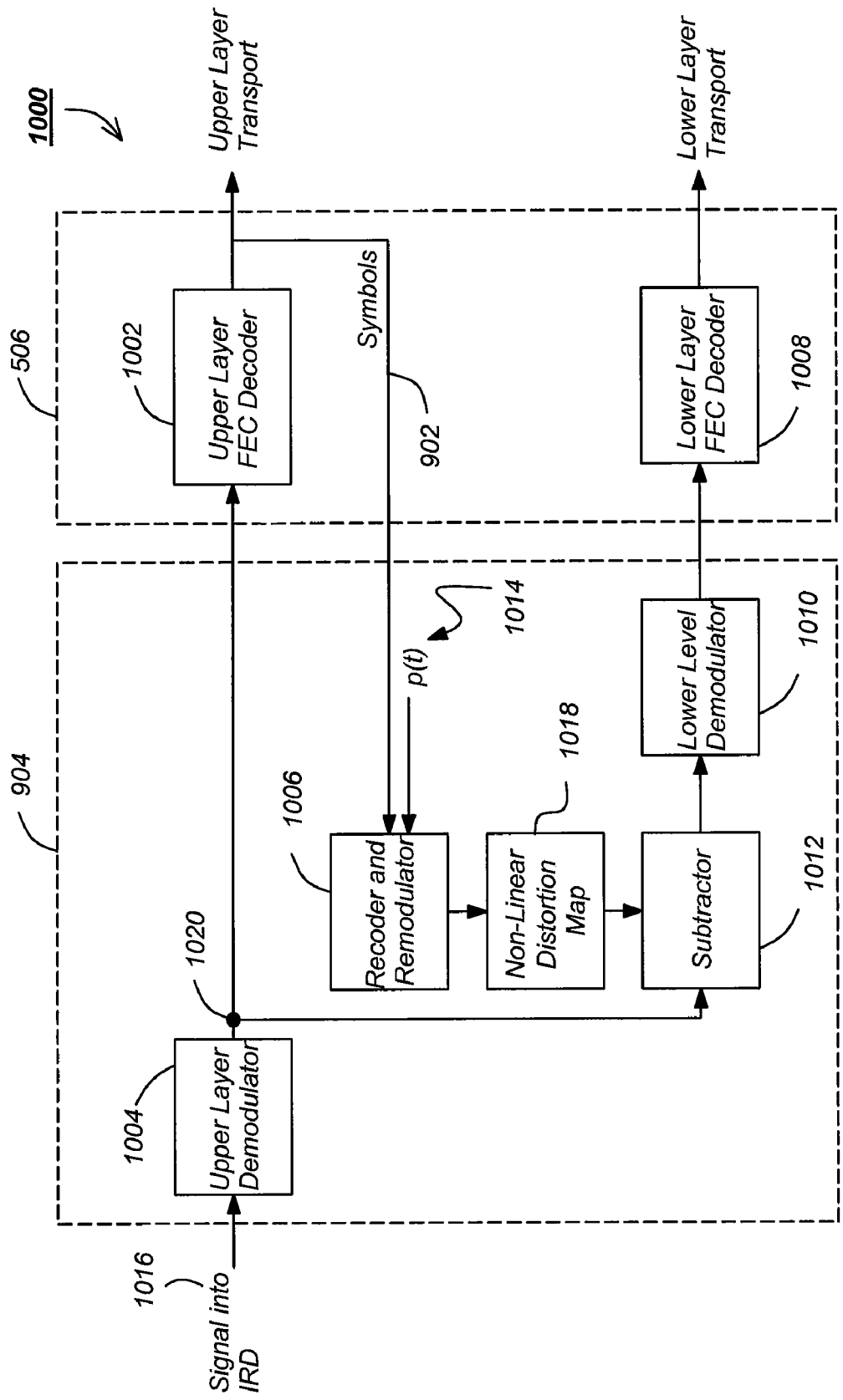
FIG. 10A is a block diagram of one embodiment of the enhanced tuner/modulator and FEC decoder.

FIG. 10A is a block diagram of one embodiment of the enhanced tuner/modulator 904 and FEC decoder 506. FIG. 10A depicts reception where layer subtraction is performed on a signal where the upper carrier has been demodulated. The upper layer of the received combined signal 1016 from the LNB 502, which may contain legacy modulation format, is provided to and processed by an upper layer demodulator 1004 to produce the stable demodulated signal 1020. The demodulated signal 420 is fed to a communicatively coupled FEC decoder 402 which decodes the upper layer to produce the upper layer symbols which are output to an upper layer transport. The upper layer symbols are also used to generate an idealized upper layer signal. The upper layer symbols may be produced from the decoder 402 after Viterbi decode ($BER<10^{-3}$ or so) or after Reed-Solomon (RS) decode ($BER<10^{-9}$ or so), in typical decoding operations known to those skilled in the art. The upper layer symbols are provided via feedback path 902 from the upper layer decoder 402 to a re-encoder/remodulator 406 which effectively produces an idealized upper layer signal. The idealized upper level signal is subtracted from the demodulated upper layer signal 1020.

In order for the subtraction to leave a clean small lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRD in AM-AM and/or AM-PM maps 1018, used to eliminate the distortion.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to the transport module 508.

Figure 10B:
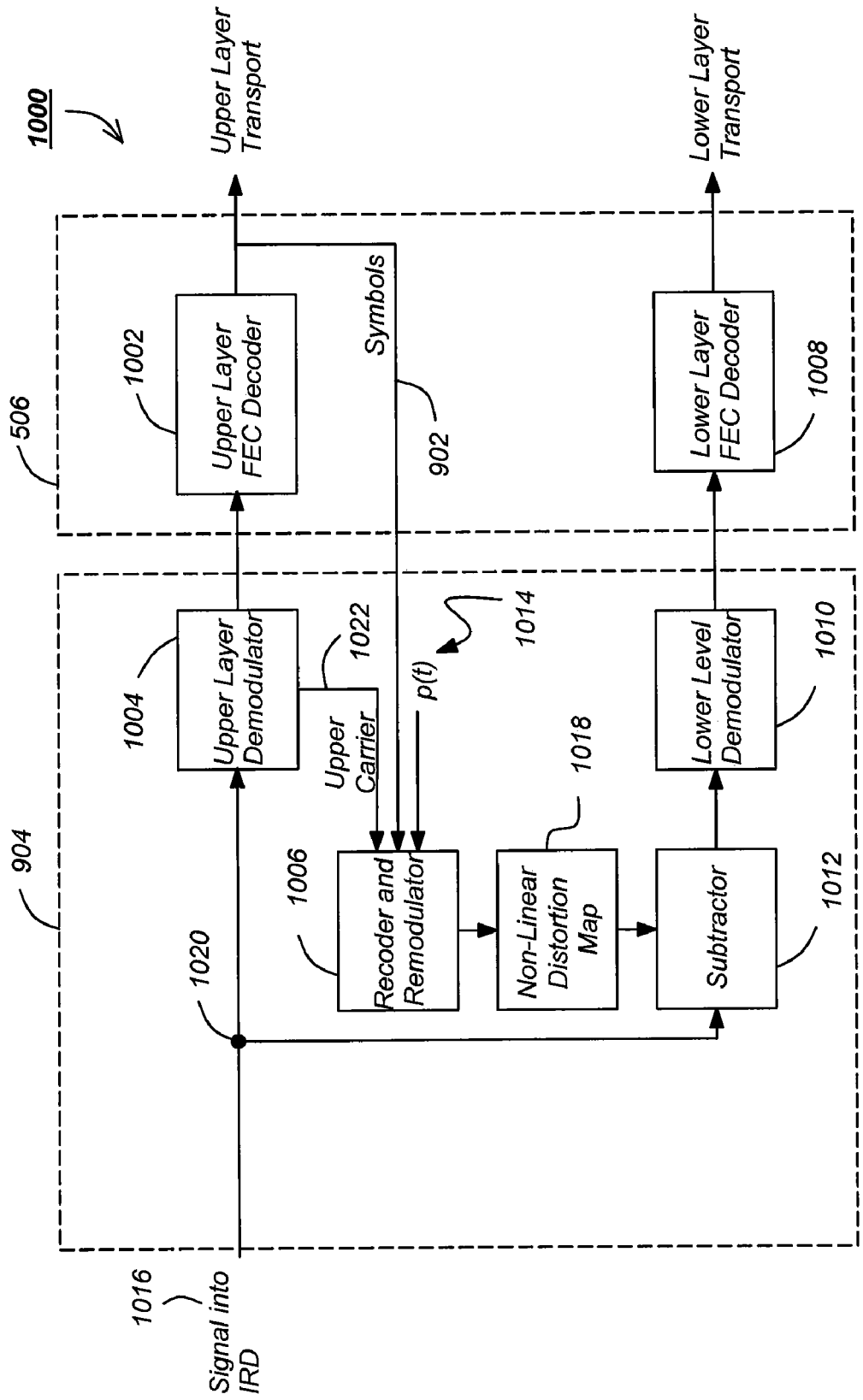
FIG. 10B depicts another embodiment of the enhanced tuner/modulator wherein layer subtraction is performed on the received layered signal.

FIG. 10B depicts another embodiment wherein layer subtraction is performed on the received layered signal. In this case, the upper layer demodulator 1004 produces the upper carrier signal 1022 (as well as the stable demodulated signal output 1020). An upper carrier signal 1022 is provided to the remodulator 1006. The remodulator 1006 provides the remodulated signal to the non-linear distortion mapper 1018 which effectively produces an idealized upper layer signal. Unlike the embodiment shown in FIG. 10A, in this embodiment, the idealized upper layer signal includes the upper layer carrier for subtraction from the received combined signal 416.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t - mT)\right) +$$
$$f_L\left(M_L \exp(j\omega_L t + \theta_L) \sum_{n=-\infty}^{\infty} S_{Lm} p(t - mT + \Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are $\omega_U$, $\theta_U$ and $\omega_U$, $\theta_U$, respectively. The symbol timing misalignment between the upper and lower layers is $\Delta T_m$. $p(t-mT)$ represents the time shifted version of the pulse shaping filter $p(t)$ 414 employed in signal modulation. QPSK symbols $S_{Um}$ and $S_{Lm}$ are elements of $$\left\{\exp\left(j\frac{n\pi}{2}\right), n = 0, 1, 2, 3\right\}.$$

$f_U(\bullet)$ and $f_L(\bullet)$ denote the distortion function of the TWTAs for the respective signals.

Ignoring $f_U(\bullet)$ and $f_L(\bullet)$ and noise $n(t)$, the following represents the output of the demodulator 1004 to the FEC decoder 1002 after removing the upper carrier:

$$s'_{UL}(t) = M_U \sum_{m=-\infty}^{\infty} S_{Um} p(t - mT) +$$
$$M_L \exp\{j(\omega_L - \omega_U)t + \theta_L - \theta_U\} \sum_{m=-\infty}^{\infty} S_{Lm} p(t - mT + \Delta T_m)$$

Because of the magnitude of difference between $M_U$ and $M_L$, the upper layer decoder 402 disregards the $M_L$ component of the $s'_{UL}(t)$.

After subtracting the upper layer from $s_{UL}(t)$ in the subtractor 1012, the following remains:

$$s_L(t) = M_L \exp\{j(\omega_L - \omega_U)t + \theta_L - \theta_U\} \sum_{m=-\infty}^{\infty} S_{Lm} p(t - mT + \Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles a current 6/7 rate capacity by adding a TWTA approximately 6.2 dB above an existing TWTA power. New QPSK signals may be transmitted from a separate transmitter, for example, from a different satellite. In addition, there is no need for linear traveling wave tube amplifiers (TWTAs) as with 16QAM. Also, no phase error penalty is imposed on higher order modulations such as 8PSK and 16QAM.

Backward Compatible Applications

Figure 11A:
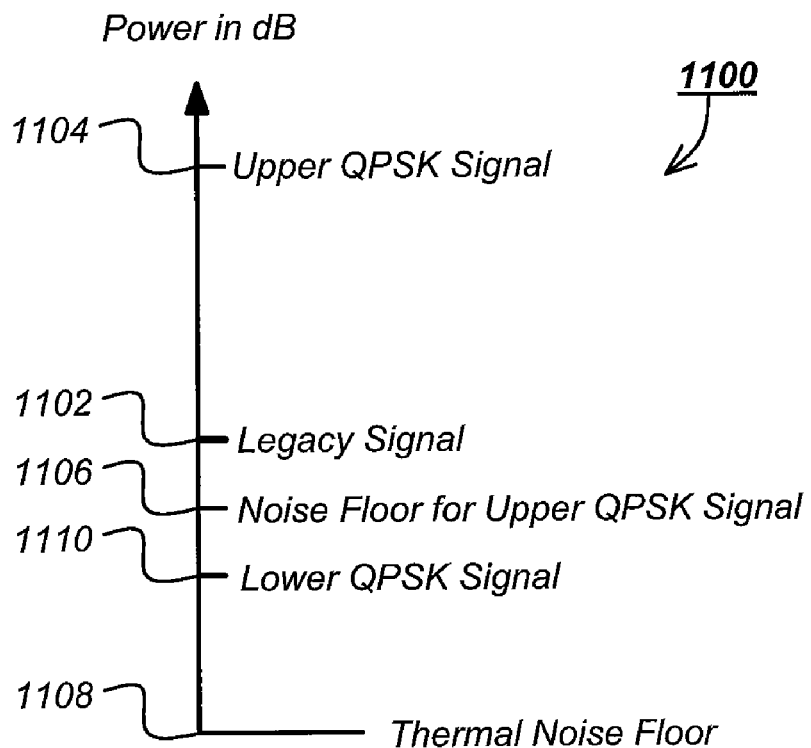
FIGS. 11A and 11B depict the relative power levels of examples of embodiments of the present invention.

FIG. 11A depicts the relative power levels 1100 of example embodiments of the present invention. FIG. 11A is not drawn to scale. This embodiment doubles the pre-existing rate 6/7 capacity by using a TWTA 6.2 dB above a pre-existing TWTA equivalent isotropic radiated power (EIRP) and second TWTA 2 dB below the pre-existing TWTA power. This embodiment uses upper and lower QPSK layers which are non-coherent. A code rate of 6/7 is also used for both layers. In this embodiment, the signal of the legacy QPSK signal 1102 is used to generate the upper layer 1104 and a new QPSK layer is the lower layer 1110. The CNR of the legacy QPSK signal 1102 is approximately 7 dB. In the present invention, the legacy QPSK signal 1102 is boosted in power by approximately 6.2 dB bringing the new power level to approximately 13.2 dB as the upper layer 1104. The noise floor 1106 of the upper layer is approximately 6.2 dB. The new lower QPSK layer 1110 has a CNR of approximately 5 dB. The total signal and noise of the lower layer is kept at or below the tolerable noise floor 1106 of the upper layer. The power boosted upper layer 1104 of the present invention is also very robust, making it resistant to rain fade. It should be noted that the invention may be extended to multiple layers with mixed modulations, coding and code rates.

In an alternate embodiment of this backwards compatible application, a code rate of 2/3 may be used for both the upper and lower layers 1104, 1110. In this case, the CNR of the legacy QPSK signal 1102 (with a code rate of 2/3) is approximately 5.8 dB. The legacy signal 1102 is boosted by approximately 5.3 dB to approximately 11.1 dB (4.1 dB above the legacy QPSK signal 1102 with a code rate of 2/3) to form the upper QPSK layer 1104. The new lower QPSK layer 1110 has a CNR of approximately 3.8 dB. The total signal and noise of the lower layer 1110 is kept at or below approximately 5.3 dB, the tolerable noise floor 1106 of the upper QPSK layer. In this case, overall capacity is improved by 1.55 and the effective rate for legacy IRDs will be 7/9 of that before implementing the layered modulation.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the code rate unchanged at 6/7 to create the upper QPSK layer 1104. The new lower QPSK layer 1110 may use a code rate of 2/3 with a CNR of approximately 3.8 dB. In this case, the total capacity relative to the legacy signal 1102 is approximately 1.78. In addition, the legacy IRDs will suffer no rate decrease.

Non-Backward Compatible Applications

As previously discussed the present invention may also be used in "non-backward compatible" applications. In a first example embodiment, two QPSK layers 1104, 1110 are used each at a code rate of 2/3. The upper QPSK layer 504 has a CNR of approximately 4.1 dB above its noise floor 1106 and the lower QPSK layer 1110 also has a CNR of approximately 4.1 dB. The total code and noise level of the lower QPSK layer 1110 is approximately 5.5 dB. The total CNR for the upper QPSK signal 1104 is approximately 9.4 dB, merely 2.4 dB above the legacy QPSK signal rate 6/7. The capacity is approximately 1.74 compared to the legacy rate 6/7.

Figure 11B:
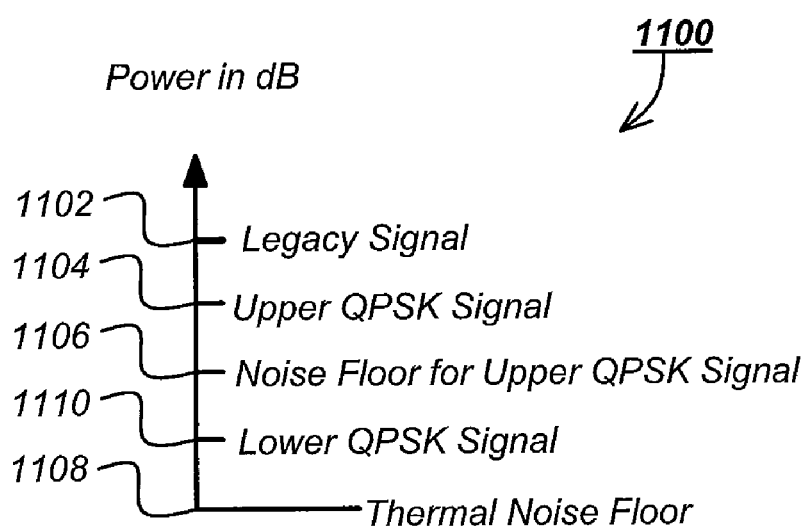

FIG. 11B depicts the relative power levels of an alternate embodiment wherein both the upper and lower layers 1104, 1110 are below the legacy signal level 1102. The two QPSK layers 1104, 1110 use a code rate of 1/2. In this case, the upper QPSK layer 1104 is approximately 2.0 dB above its noise floor 1106 of approximately 4.1 dB. The lower QPSK layer has a CNR of approximately 2.0 dB and a total code and noise level at or below 4.1 dB. The capacity of this embodiment is approximately 1.31 compared to the legacy rate 6/7.

Lower Complexity Layered
Modulation/Demodulation

Referring again to the enhanced tuner/modulator 904 and decoder 506 illustrated in FIG. 10A, it is noted that the decoder 506 includes an upper layer FEC decoder 1002 and a lower level decoder 1008. When the upper and lower layer signals (UL+LL) 1016 enter the IRD 802, the upper layer signal (UL) is demodulated by upper layer demodulator 1104 and decoded by the upper layer decoder 1002. To extract the lower layer (LL) signals, the upper layer (UL) symbols are then re-encoded, and the signal is remodulated by remodulator 1006. A signal processor module 1018 then alters the UL signal by introducing effects that are produced by the satellite transponder amplifier and re-normalizes the amplitude, thus creating a reconstituted, idealized UL signal. This reconstituted UL signal is subtracted from the composite UL+LL signal by subtractor 1012, yielding the LL signal. The LL signal is then decoded using a demodulator 1010 and decoder 1008, preferably optimized for the LL signal.

Advanced coders, such as turbo coders and LDPC coders, are newly developed or rediscovered, highly efficient forward error correcting codes. They can provide quasi error free operation at lower carrier to noise ratios than other FEC codes.

However, advanced coders provide improved C/N performance at the expense of additional processing. This, in turn, means that the advanced decoder requires more resources on the receiver/processor ASIC, thereby increasing the cost of the chip. Furthermore, as shown in FIG. 10A, two decoders are required to demodulate the transmitted signal—one for the UL signal and one for the LL signal. The signal processing requirements and the overall receiver chip complexity can be significantly reduced if this decoder redundancy is eliminated.

The present invention takes advantage of the fact that UL and LL signals are decoded using a serial path, wherein the UL is decoded from the composite UL+LL signal, then the LL signal is decoded from the (UL+LL)−UL signal. In one embodiment the decoder operates first on the extracted UL signal and then on the LL signal. By staggering the processing times and other factors the operation of the decoder can be scheduled for first the UL, then the LL, and so on.

Consider, for example, a single, high data rate channel providing 50 Mbits/s (a value well within the state of the art). The demodulator and decoder for this channel can, by design, sustain a continuous rate of 50 Mbits/s. Now consider two layers: a UL with a data rate of about 30 Mbits/s and a LL with a data rate of about 20 Mbits/s. If these two layers were a single signal, a single decoder would be used to handle the full 50 Mbit/s data rate. The issue becomes one of scheduling the operation of the decoder for the UL or LL, not whether the decoder could handle the aggregate data rate. Several different embodiments that offer further savings are identified and described below.

Figure 12A:
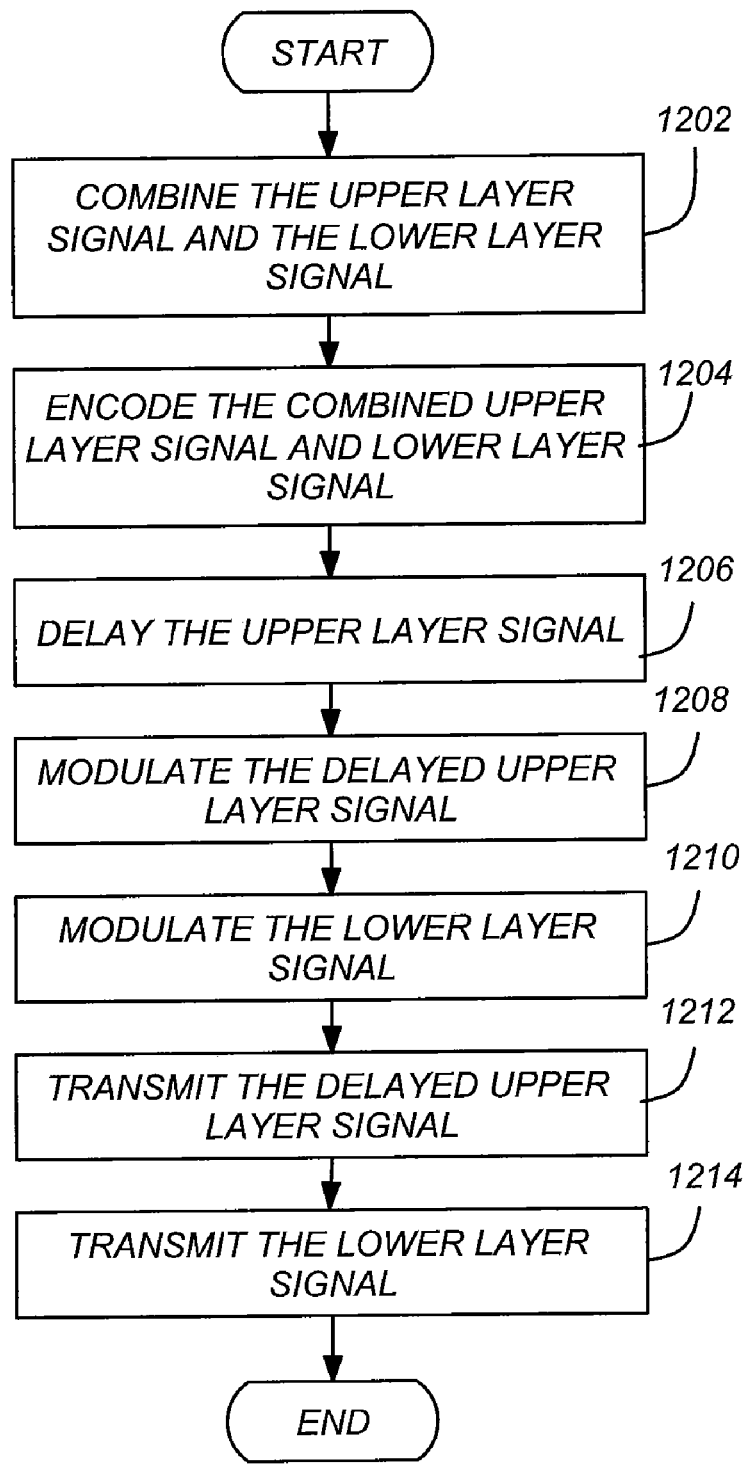
FIGS. 12A and 12B are flow charts describing exemplary operations that can be used to transmit and receive layered modulation signals.
Figure 12B:
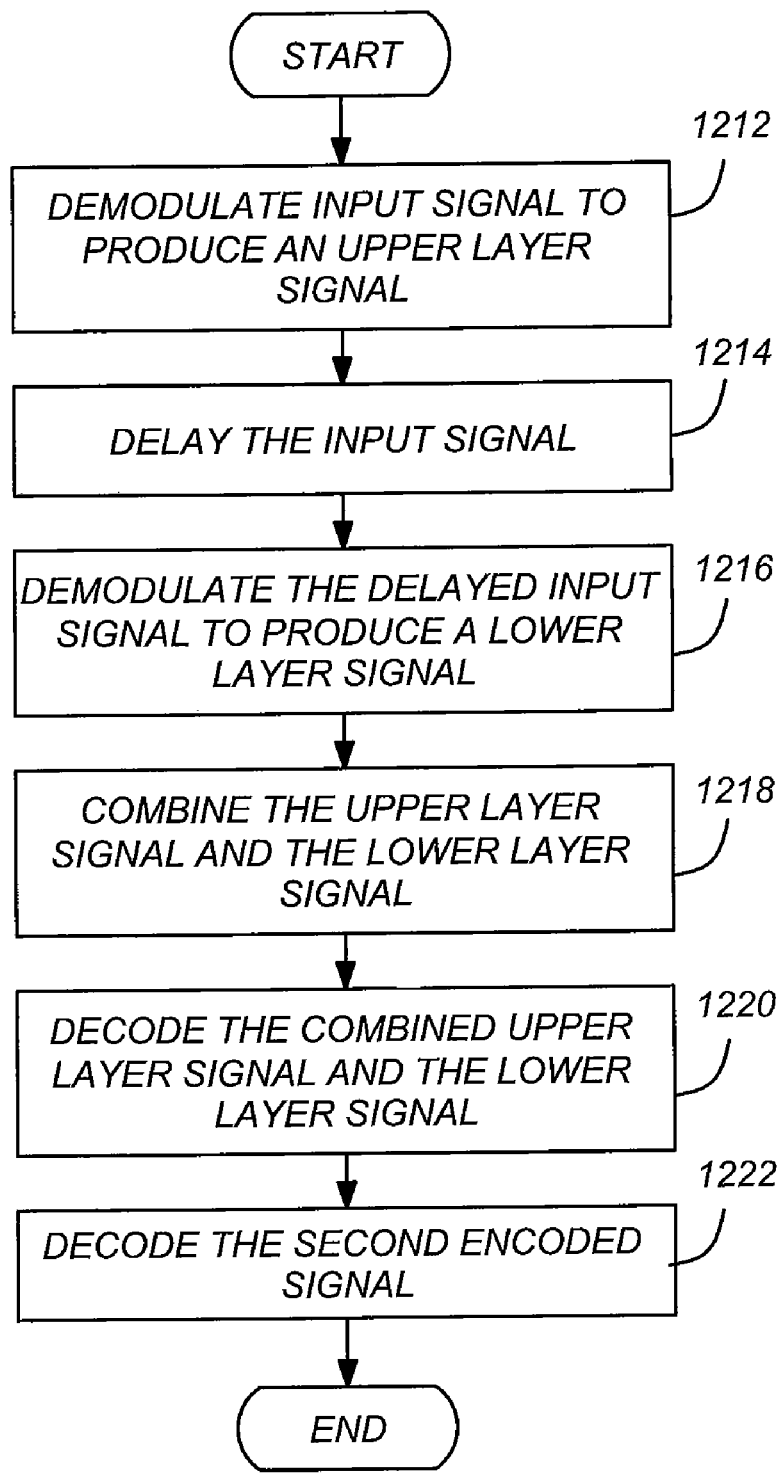
Figure 13:
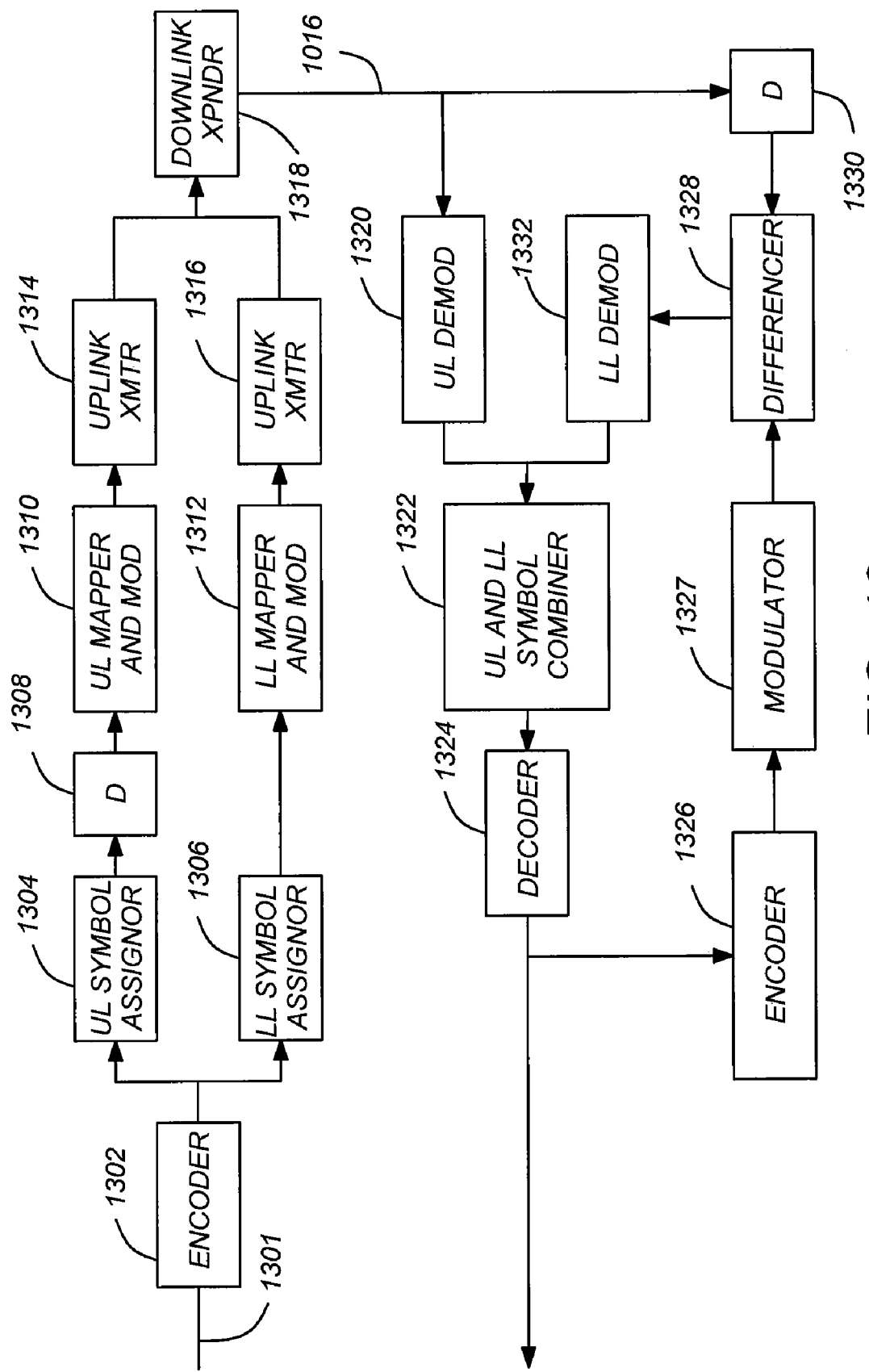
FIG. 13 presents a block diagram of salient elements of a representative transmitter and receiver that can perform the operations described in FIGS. 12A and 12B.

FIGS. 12A and 12B are flow charts describing exemplary operations that can be used to transmit and receive layered modulation signals. FIG. 12A describes exemplary transmission operations while FIG. 12B describes exemplary reception operations. FIGS. 12A and 12B will be discussed in further reference to FIG. 13 and FIG. 14. FIG. 13 presents a block diagram of salient elements of a representative transmitter and receiver that can perform the operations described in FIGS. 12A and 12B, while FIG. 14 presents a diagram showing the timing relationship of the UL and LL signals.

Referring first to FIG. 12A, the upper layer signal and lower layer signal are combined to form an input signal 1301, as showing block 1202. In block 1204, the combined upper layer and lower layer signals are encoded. This can be accomplished, for example, using the encoder shown in FIG. 13. Next, symbols are assigned to the encoded upper and lower layer signals. This can be accomplished by the UL symbol assignor 1304 and the LL symbol assignor 1306. The UL signal, in the form of UL symbols, is then delayed by delay element 1308. This is shown in block 1206. As will become clear, the upper layer signal is delayed by an amount of time necessary for a receiver of the transmitted coded signal to remodulate and re-encode a demodulated upper layer signal so that the lower layer signal can be incoherently demodulated.

The upper layer signal is then mapped to the desired constellation and modulated by mapper/modulator 1310. Similarly, the lower layer signal is mapped and modulated by mapper modulator 1312. This is shown in blocks 1208 and 1210. The modulated upper layer and lower layer signals are uplinked from the uplink center 104 via uplink transmitters 1314, 1316, uplink 116, and downlinked to an IRD 500 at the receiving station 110 via downlink transponder 1318 and downlink 118.

FIG. 12B presents exemplary steps that can be used to receive, demodulate, and decode the transmitted signal. The transmitted signal is demodulated to produce the upper layer signal, as shown in block 1212. This can be performed by the upper layer demodulator 1320 shown in FIG. 13. The input signal is then delayed, as shown in block 1214. This can be performed by the delay element 1330. The delayed input signal is then demodulated to produce the lower layer signal, as shown in block 1216.

The input signal is demodulated by extracting the lower layer signal from the upper layer signal with differencer 1328. The upper layer signal is reconstituted by re-encoding and remodulating the upper layer signal demodulated and decoded by the upper layer demodulator 1320 and decoder 1324. This is accomplished by the encoder 1326, and the modulator 1327.

Delay element 1330 delays the lower layer signal in an amount approximately equivalent to the amount that the upper layer signal was delayed by block 1308. The use of delay elements 1308 and 1330 accounts for the time required to re-encode, remodulate the upper layer signal and extract the lower layer signal.

Figure 14A:
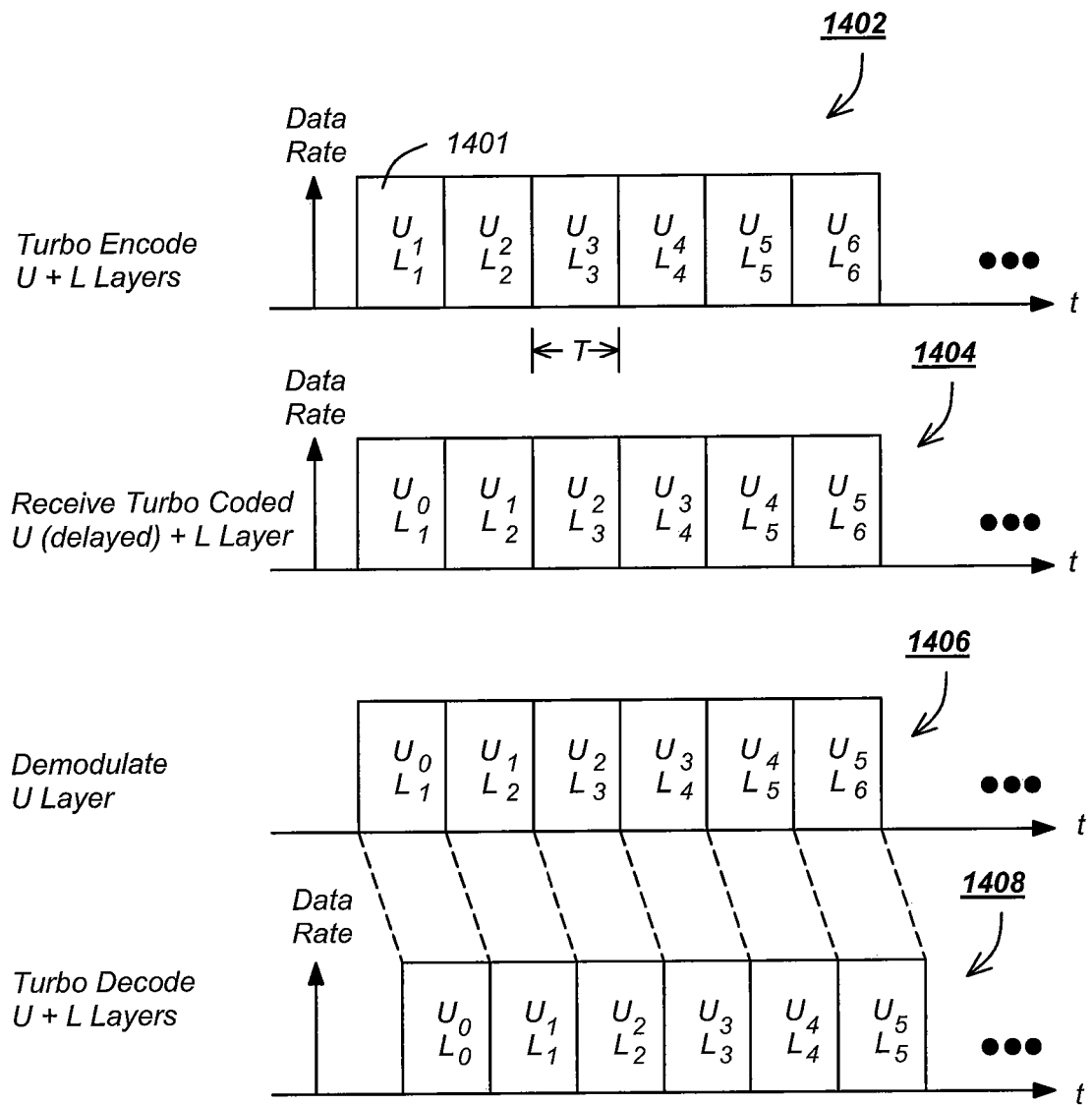
FIGS. 14A and 14B are diagrams showing the timing relationship of the UL and LL signals.

FIG. 14A is a diagram showing the relative timing of the upper layer signal and the lower layer signal. Blocks 1401 of the combined upper layer signal at succeeding periods of time $$\left(\text{denoted } \frac{U_1}{L_1}, \frac{U_2}{L_2}, \ldots, \frac{U_N}{L_N}\right)$$

are encoded according to a coding period T to produce data stream 1402. The upper layer signal $U_1, U_2, \ldots, U_N$ is delayed before being modulated, uplinked, and downlinked, so the received data stream becomes $$\frac{U_0}{L_1}, \frac{U_1}{L_2}, \ldots, \frac{U_{N-1}}{L_N}.$$

The upper layer signal is then demodulated, producing data stream 1406. This upper layer signal is decoded, re-encoded, and modulated by the decoder 1324, encoder 1326 and modulator 1327, and provided to the differencer 1328 to extract the lower level signal. Since the lower layer signal is delayed by delay element 1330, the timing relationship of the demodulated upper and lower level signals is as shown in data stream 1408, with the upper and lower level signals once again in a proper timing relationship.

Since the decoded upper layer signal is used to demodulate and decode the lower layer as well, the above operations require that the upper layer signal must be decodable in its own right from the encoded combined upper and lower layer signals. To achieve this, timing data such as initialization blocks (IB) having known, predetermined lower layer data can be inserted into at least some of the signal blocks $$\frac{U_1}{L_1}, \frac{U_2}{L_2}, \ldots, \frac{U_N}{L_N}.$$

These IBs can be inserted periodically or aperiodically. The lower layer demodulator 1332 can also search for these blocks for timing and synchronization purposes as well.

The inclusion of IBs decreases the throughput by a small amount. For example, if the IBs include a 10K block of data and the data is transmitted at a 25 MHz rate, each block would be approximately 0.5 milliseconds in length, transmitted every 25 milliseconds. This indicates that including the IBs results in a 2% reduction in throughput.

Figure 14B:
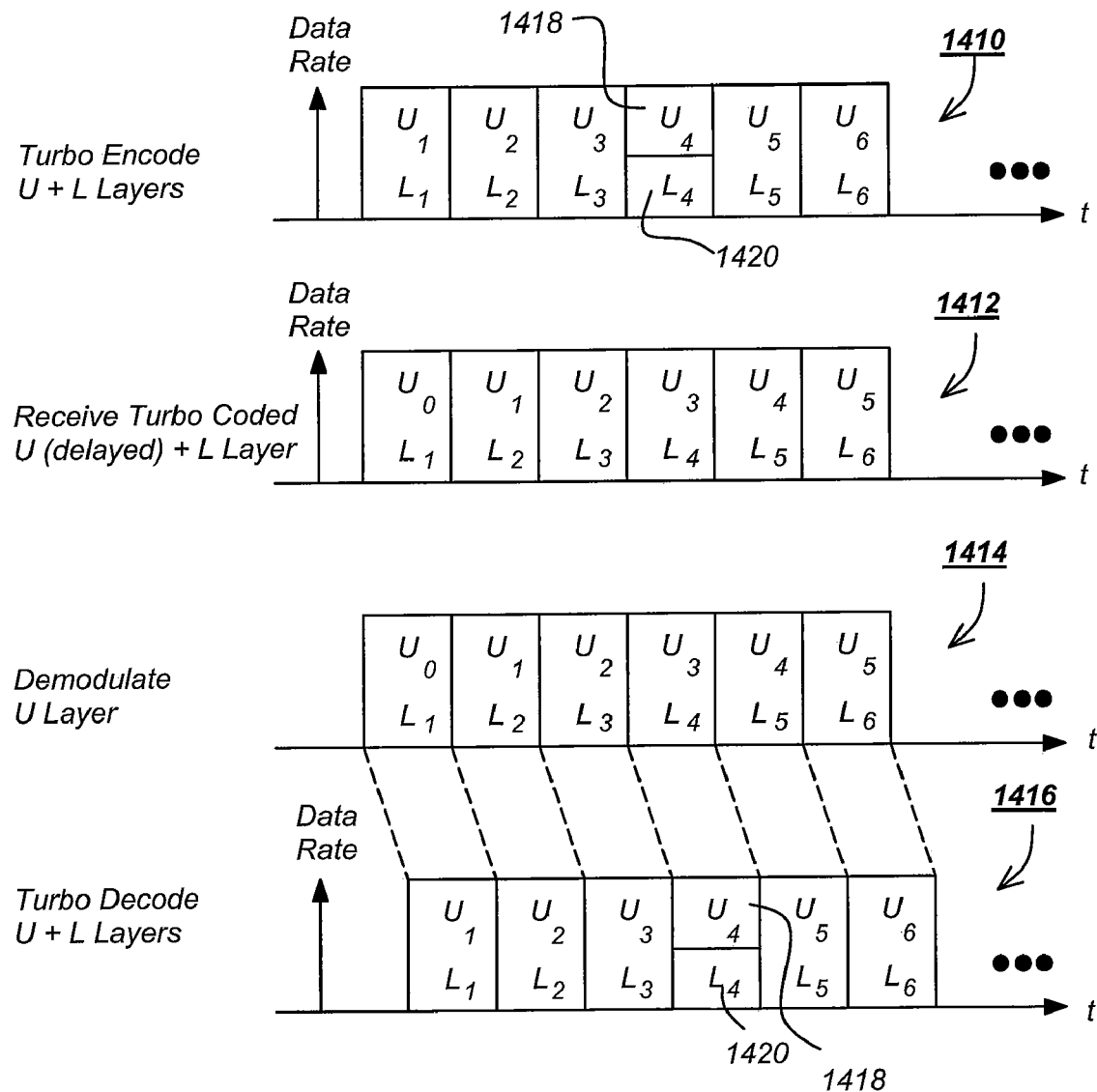

FIG. 14B is a diagram presenting the timing relationship of the UL and LL signals in another embodiment of the present invention. In this embodiment, the majority of the blocks 1401 are as was described in FIG. 14A. However, some of portion of the upper layer signal and the lower layer signal are separately encoded, producing separate blocks 1418, 1420 of data. Separately encoded data blocks having timing data in the form of IBs can be inserted from time-to-time in the data stream 1410, either periodically or aperiodically. Since the upper layer signal is separately encoded from the lower layer signal, the upper layer signal is decodable by itself, and does not require known lower layer data to be inserted in the IBs as was the case with the embodiment illustrated in FIG. 14A. In one embodiment, for uniformity in block timing, the IB codeword length is ½ that of the codeword described in FIG. 14A. Since the codeword for the upper layer data and the lower layer data is smaller than was the case in the embodiment illustrated in FIG. 14A, this embodiment can result in slightly greater errors, but the code rate may be reduced to account for the smaller codeword, if desired. Unlike the embodiment shown in FIG. 14A, this embodiment assures that both the upper layer signal and the lower layer signal carry payload to maximize spectral throughput.

Figure 15A:
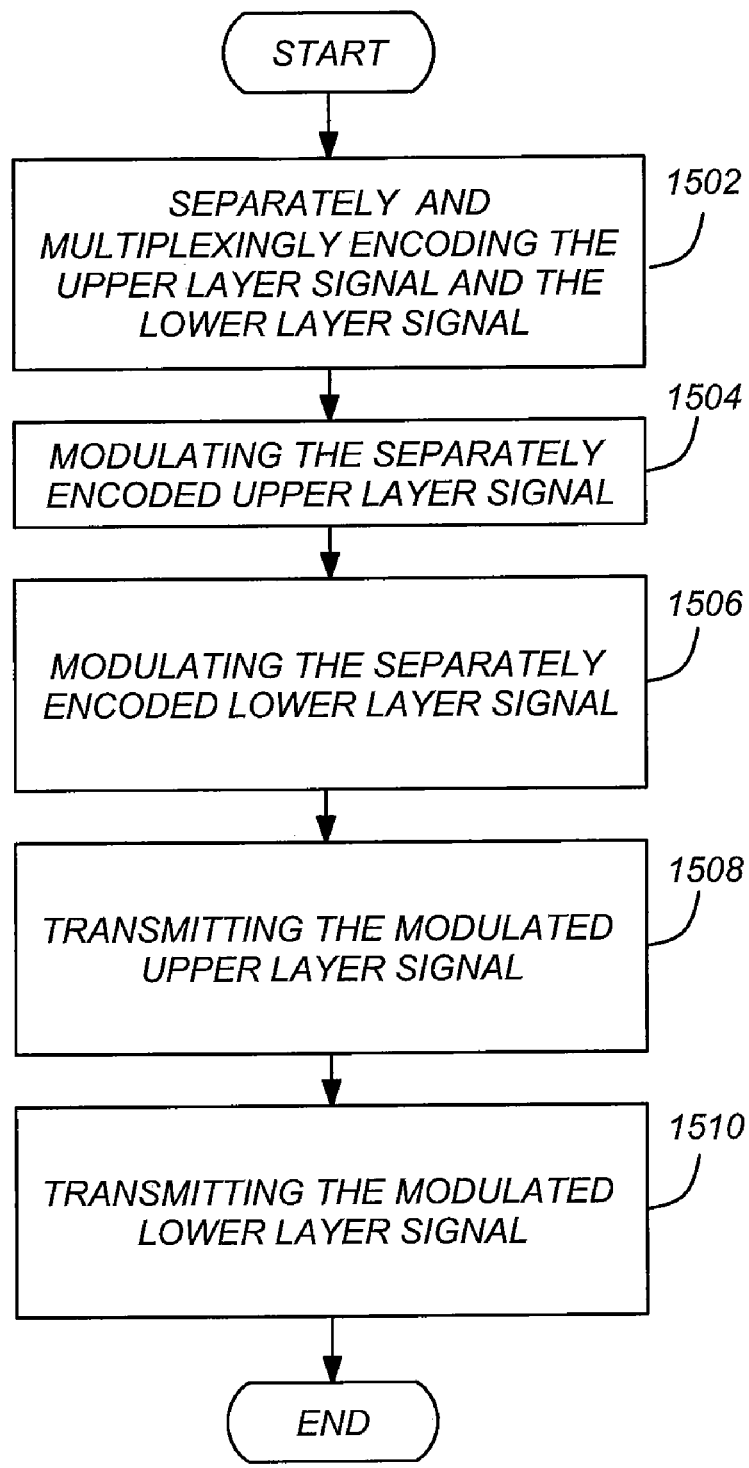
FIGS. 15A and 15B depict illustrative process steps that can be used to practice another embodiment of the invention.
Figure 15B:
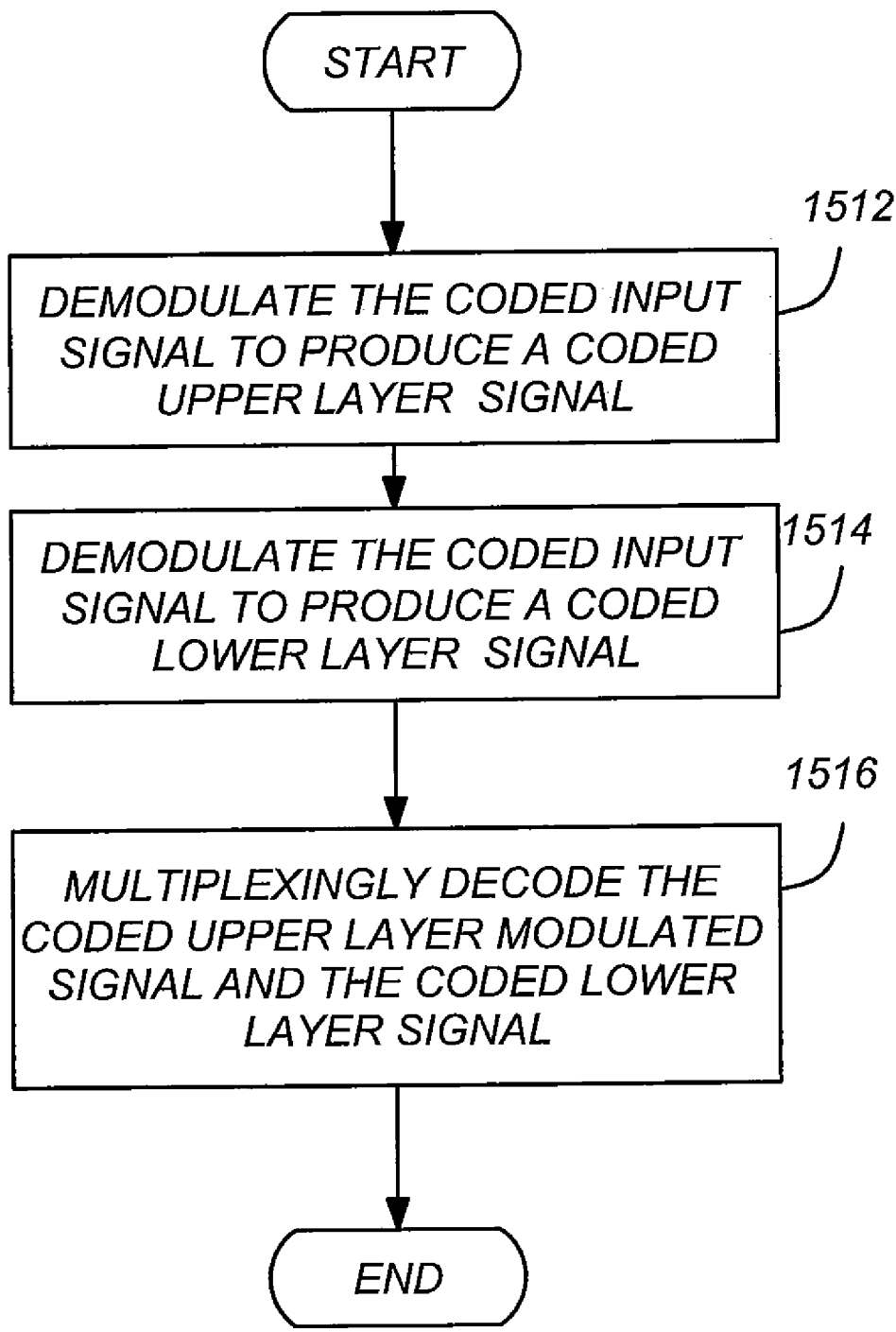
Figure 16:
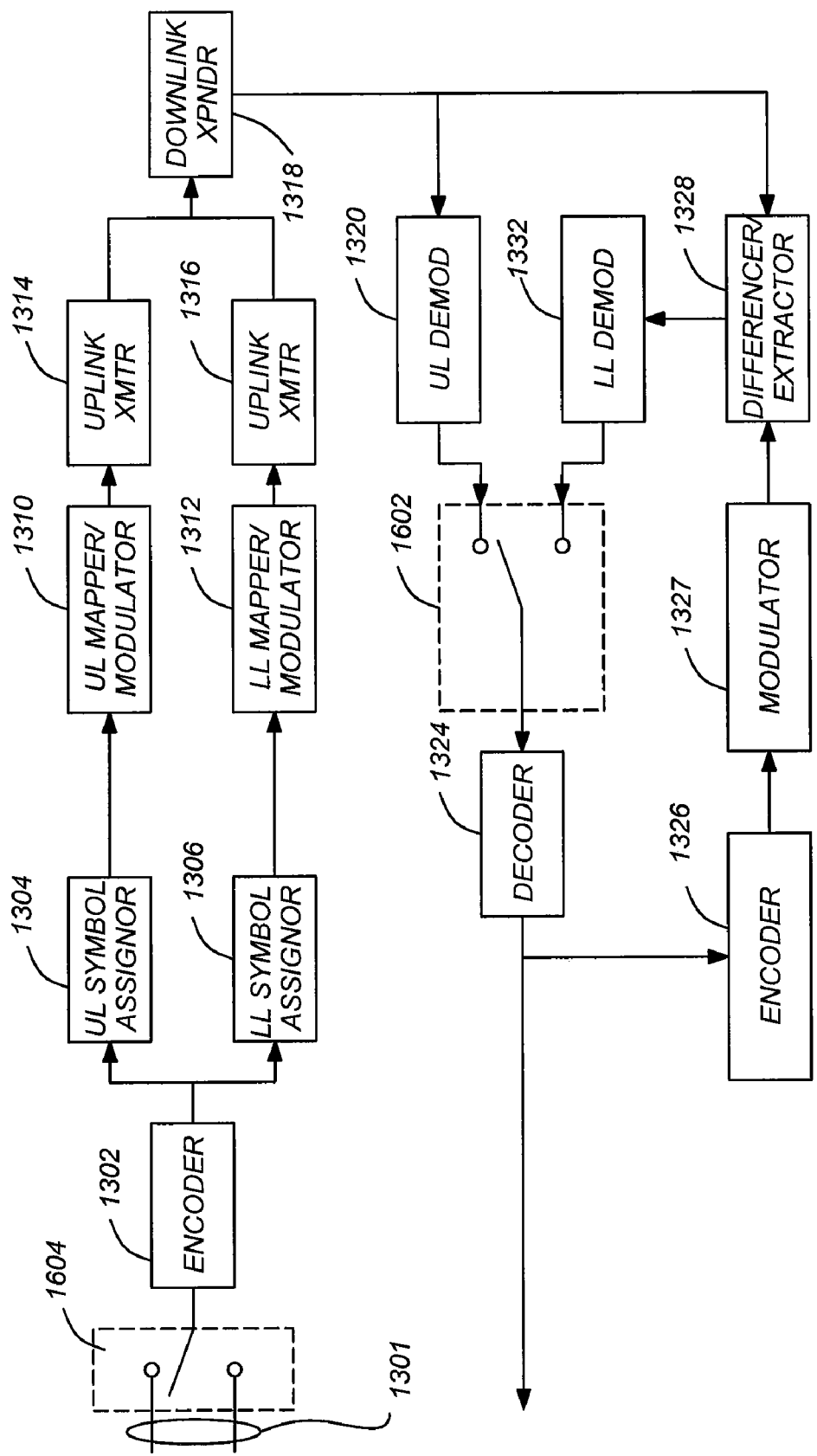
FIG. 16 presents a block diagram of salient elements of a alternative transmitter and receiver that can perform the operations described in FIGS. 12A and 12B.

FIGS. 15A and 15B are diagrams showing illustrative process steps that can be used to practice another embodiment of the invention. FIGS. 15A and 15B are discussed in concert with FIGS. 16 and 17. FIG. 16 presents a block diagram of salient elements of a representative transmitter and receiver that can perform the operations described in FIGS. 12A and 12B. In this embodiment, the upper layer signal and the lower layer signal are separately and multiplexingly encoded, as shown in block 1502. This can be accomplished by using multiplexer 1604 to apply the upper layer signal and the lower layer signal to a single encoder such as encoder 1302 shown in FIG. 16. As before, upper layer and lower layer symbols are assigned, and the upper layer, and the upper layer signal and the lower layer signal is mapped and modulated, as shown in blocks 1504 and 1506. This can be accomplished, for example, by mapper/modulators 1310 and 1312. The result is transmitted, as shown in blocks 1508 and 1510. This can be accomplished by uplink transmitters 1314 and downlink transponder 1318.

Turning to FIG. 15B, the received coded input signal is demodulated to produce a coded upper layer signal and a coded lower layer signal. This is shown in blocks 1512 and 1514. These demodulation steps can be performed, for example, by demodulators 1320 and 1322. The coded upper layer signal and the coded lower layer signal are then multiplexingly decoded, as shown in block 1516. This can be performed, for example, by alternatively using the switch 1602 or multiplexer to apply the demodulated coded signals to the decoder 1324.

In this embodiment, the same code can be used for the upper and lower layer signals, and a single decoder 1324 in the IRD 500 is multiplexed between the upper layer and lower layer signals, preferably with a ½ duty cycle. Also, this embodiment includes buffer storage for decoding in the amount of ¾ of a block for upper layer 4-bit symbols, and one block for lower layer symbols.

Figure 17:
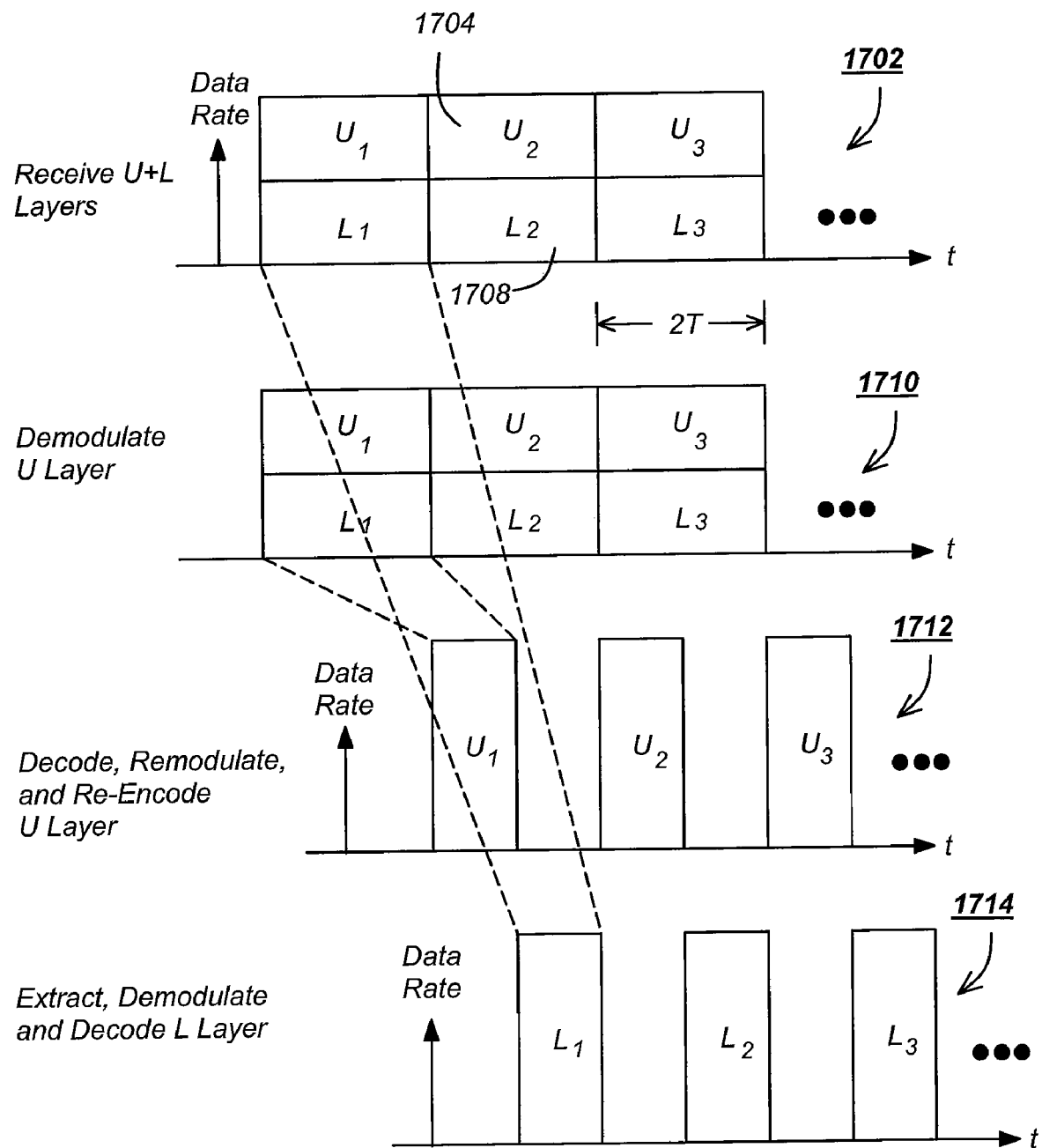
FIG. 17 is a diagram showing representative data streams resulting from the processes described in FIGS. 15A and 15B.

This process is illustrated in FIG. 17, which shows representative data streams from the foregoing processes. Data stream 1702 shows the upper and lower layer signals arriving at the receiver. The upper and lower layer signals arrive in separate blocks 1704 and 1708, each of which were separately encoded by the encoder 1302. The upper layer signal is simply demodulated, resulting in data stream 1710. The upper layer signal is then decoded. Since the upper layer signal was separately encoded, this is possible to achieve with the upper layer signal alone. The decoded upper layer signal is then remodulated and re-encoded, resulting in data stream 1712. The result is used to demodulate the lower layer, with the results shown in data stream 1714. The demodulated upper and lower layers are at this point, interleaved with one another, and are provided to the decoder 1324. The results can be de-interleaved by a de-interleaver and can be applied to a Reed-Solomon or similar decoder as well.

The layered modulation (LM) technique described above typically requires the use of satellite transponders 108A, 108B having greater power output than those associated with ordinary modulation techniques. Typically, the upper signal layer 402 must be modulated by a carrier of substantially higher power than the lower signal layer 420. Also, backwards compatible (BWC) applications typically require more power than non-BWC applications for the upper signal layer 402.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, it is noted that the uplink configurations depicted and described in the foregoing disclosure can be implemented by one or more hardware modules, one or more software modules defining instructions performed by a processor, or a combination of both.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting a coded signal having an upper layer signal and a lower layer signal, comprising the steps of:
    multiplexingly applying the upper layer signal and lower layer signal to an encoder to separately encode the upper layer signal and the lower layer signal;
    modulating, in a first modulator, the separately encoded upper layer signal;
    modulating, in a second modulator, the separately encoded lower layer signal;
    transmitting, in a first transmitter, the modulated and separately encoded upper layer signal; and
    transmitting, in a second transmitter, the modulated and separately encoded lower layer signal.

2. The method of claim 1, wherein the upper layer signal and the lower layer signal are encoded by the same code.

3. The method of claim 1, wherein the step of multiplexingly applying the upper layer signal and lower layer signal to an encoder comprises the step of alternately applying the upper layer signal and the lower layer signal to an encoder.

4. The method of claim 1, wherein:
    the upper layer signal is a legacy upper layer signal receivable by a plurality of legacy receivers and a plurality of layered modulation receivers;
    the lower layer signal is non-coherently layered over the legacy upper layer signal; and
    the lower layer signal is receivable by the plurality of layered modulation receivers and not receivable by the plurality of legacy receivers.

5. An apparatus for transmitting a coded signal having an upper layer signal and a lower layer signal, comprising:
    means multiplexingly applying the upper layer signal and lower layer signal to an encoder to separately encode the upper layer signal and the lower layer signal;
    means for modulating the separately encoded upper layer signal;
    means for modulating the separately encoded lower layer signal;
    means for transmitting the modulated and separately encoded upper layer signal; and
    means for transmitting the modulated and separately encoded lower layer signal.

6. The apparatus of claim 5, wherein the upper layer signal and the lower layer signal are encoded by the same code.

7. The apparatus of claim 5, wherein the means for multiplexingly applying the upper layer signal and lower layer signal to an encoder comprises means for alternately applying the upper layer signal and the lower layer signal to an encoder.

8. The apparatus of claim 5, wherein:
    the upper layer signal is a legacy upper layer signal receivable by a plurality of legacy receivers and a plurality of layered modulation receivers;
    the lower layer signal is non-coherently layered over the legacy upper layer signal; and
    the lower layer signal is receivable by a layered modulation receivers and not receivable by the legacy receivers.

9. An apparatus for transmitting a coded signal having an upper layer signal and a lower layer signal, comprising:
    a multiplexer for separately and multiplexingly applying the upper layer signal and lower layer signal to an encoder;
    a modulator, communicatively coupled to the encoder, for modulating the separately encoded upper layer signal;
    a second modulator, communicatively coupled to the encoder, for modulating the separately encoded lower layer signal;
    a transmitter, communicatively coupled to the modulator, the transmitter for transmitting the modulated and separately encoded upper layer signal; and
    a second transmitter, coupled to the second modulator, the second transmitter for transmitting the modulated and separately encoded lower layer signal.

10. The apparatus of claim 9, wherein the upper layer signal and the lower layer signal are encoded by the same code.

* * * * *